US011352464B2

(12) United States Patent
Costa et al.

(10) Patent No.: US 11,352,464 B2
(45) Date of Patent: Jun. 7, 2022

(54) PROCESS TO PREPARE POLYESTER POLYMER AND POLYESTER POLYMER OBTAINABLE THEREBY

(71) Applicant: Sulzer Chemtech AG, Winterthur (CH)

(72) Inventors: Liborio Ivano Costa, Winterthur (CH); Peter Joachim Fleckenstein, Zürich (CH); Jan-Georg Rosenboom, Zürich (CH); Giuseppe Storti, Zürich (CH); Massimo Morbidelli, Zürich (CH)

(73) Assignee: SULZER MANAGEMENT AG, Winterthur (CH)

( * ) Notice: Subject to any disclaimer, the term of this patent is extended or adjusted under 35 U.S.C. 154(b) by 151 days.

(21) Appl. No.: 16/337,667

(22) PCT Filed: Sep. 27, 2017

(86) PCT No.: PCT/EP2017/074485
§ 371 (c)(1),
(2) Date: Mar. 28, 2019

(87) PCT Pub. No.: WO2018/060241
PCT Pub. Date: Apr. 5, 2018

(65) Prior Publication Data
US 2019/0233583 A1 Aug. 1, 2019

(30) Foreign Application Priority Data

Sep. 29, 2016 (EP) ..................... 16191553
Apr. 21, 2017 (EP) ..................... 17167599
Apr. 21, 2017 (EP) ..................... 17167601

(51) Int. Cl.
C08G 63/42 (2006.01)
C08G 63/78 (2006.01)
C08G 63/181 (2006.01)
C08G 63/91 (2006.01)
C08G 63/90 (2006.01)
C08K 5/06 (2006.01)
C08K 5/04 (2006.01)
C08K 5/10 (2006.01)
C08K 5/13 (2006.01)

(52) U.S. Cl.
CPC ........... C08G 63/42 (2013.01); C08G 63/181 (2013.01); C08G 63/78 (2013.01); C08G 63/90 (2013.01); C08G 63/916 (2013.01); C08K 5/06 (2013.01); C08K 5/04 (2013.01); C08K 5/10 (2013.01); C08K 5/13 (2013.01)

(58) Field of Classification Search
CPC ........ C08G 63/42; C08G 63/78; C08G 63/80; C08G 63/81; C08G 63/84; C08G 63/85; C08K 5/06; C08K 5/0016; C08K 5/04; C08K 5/10; C08K 5/13
See application file for complete search history.

(56) References Cited

U.S. PATENT DOCUMENTS

| 5,348,985 A * | 9/1994 | Pearce ..................... C08J 9/04 |
| | | 521/124 |
| 5,434,244 A | 7/1995 | Warner et al. |
| 5,661,214 A * | 8/1997 | Brunelle ................ C08G 63/85 |
| | | 524/783 |
| 7,256,241 B2 * | 8/2007 | Takekoshi ............ C08F 290/00 |
| | | 502/159 |
| 9,725,558 B2 * | 8/2017 | Costa ................... C08G 63/181 |
| 10,377,853 B2 * | 8/2019 | Costa ................... C08G 63/916 |
| 2006/0128935 A1 | 6/2006 | Tam |
| 2007/0083019 A1 * | 4/2007 | Zhang .................. C08G 63/823 |
| | | 526/172 |
| 2016/0002397 A1 * | 1/2016 | Costa ................... C08G 63/916 |
| | | 264/572 |
| 2016/0017093 A1 * | 1/2016 | Costa ..................... C08G 63/16 |
| | | 528/296 |

FOREIGN PATENT DOCUMENTS

| JP | 2010-146993 A | 7/2010 |
| JP | 2012-236923 A1 | 12/2012 |
| JP | 2016-510084 A | 4/2016 |
| WO | 0218476 A2 | 3/2002 |
| WO | 2014139603 A1 | 9/2014 |
| WO | WO 2014/139602 A1 * | 9/2014 ............ C08G 63/78 |

OTHER PUBLICATIONS

Hamilton S C et al., "Cyclic polyesters: part 8. Preparation and characterization of cyclic oligomers in six aromatic ester and ether-ester systems", Polymer, Jun. 1, 1998, pp. 3241-3252, vol. 39, No. 14.
Carlos Morales-Huerta Juan et al., "Poly(alkylene 2,5-furandicarboxylate)s (PEF and PBF) by ring opening polymerization", Polymer, Feb. 3, 2016, pp. 148-158, vol. 87.
David Pfister et al., "Synthesis and Ring-Opening Polymerization of Cyclic Butylene 2,5-Furandicarboxylate", Macromolecular Chemistry and Physics, Nov. 2, 1015, pp. 2141-2146, vol. 216, No. 21.
Claude Moreau et al., "Recent Catalytic Advances in the Chemistry of Substituted Furans from Carbohydrates and in the Ensuing Polymers", Topics in Catalysis, Feb. 1, 2004, pp. 11-30, vol. 27, No. 1-4.
International Search Report and Written Opinion dated Jun. 25, 2018 in corresponding International Application No. PCT/EP2018/057518, filed Mar. 23, 2018.
Extended European Search Report dated Apr. 3, 2017 in corresponding European Patent Application No. 16191553.3, filed Sep. 29, 2016.
S. Ortanderl: "Thieme RÖMPP Wasserabscheider", Nov. 1, 2004 (Nov. 1, 2004) XP055411633 (with English Translation of Categories of Cited Documents).

(Continued)

Primary Examiner — Jane L Stanley
(74) Attorney, Agent, or Firm — Global IP Counselors, LLP

(57) ABSTRACT

A process to produce a polyester polymer by polymerization of a cyclic polyester oligomer composition comprising a cyclic polyester oligomer having furanic units in the presence of a plasticizer, as well as the polyester polymer obtained thereby.

20 Claims, 13 Drawing Sheets

(56) References Cited

OTHER PUBLICATIONS

Extended European Search Report dated Oct. 18, 2017 in corresponding European Patent Application No. 17167601.8.
Japanese Office Action dated Jun. 1, 2021 in corresponding Japanese Patent Application No. 2019-517007 (with English Translation).

* cited by examiner

Fig. 8

| | PEF | $T_M$ [°C] | PET | $T_M$ [°C] |
|---|---|---|---|---|
| Cyclic species | C2 | 370 | C2 | 225 |
| | C3 | 272 | C3 | 319 |
| | C4/C5 (92/8) | 280 | C4 | 225-326 |
| | cyOEF without C3 | 360 | C5 | 185-256 |
| | cyOEF with C3 | 340 | C6 | 305 |
| | | | C7 | 239 |
| Polymer product | PEF (ROP this work) | 210-220 | PET | 243 |
| | PEF (SSPC) | 211 | | |

| Entry | Cyclic Oligomers | Purity | Initiator | T [°C] | time [min] | X [%] | $M_n$ [kg/mol] | $M_w$ [kg/mol] |
|---|---|---|---|---|---|---|---|---|
| | | No initiator/plasticizer addition | | | | | | |
| 1 | cyOEF | 99% | - | 280 | 60 | 32 | 42.7 | 74.8 |
| 2 | cyOEF | 99% | - | 280 | 666 | 79 | 14.5 | 25.8 |
| | | Cyclic dimer polymerization feasibility | | | | | | |
| 3 | C2 | 99% | 0.10% $SnOct_2$ | 280 | 90 | 95 | 10.0 | 20.6 |
| 4 | C2 | 99% | 0.20% $SnOct_2$ | 280 | 20 | 95 | 12.2 | 20.7 |
| 5 | C2 | 99% | 0.07% cySTOX | 280 | 6 | 87 | 35.1 | 70.8 |
| 6 | C2 | 99% | 0.10% cySTOX | 280 | 13 | 92 | 33.4 | 73.4 |
| 7 | C2 | 99% | 0.15% cySTOX | 280 | 10 | 95 | 24.0 | 43.8 |
| | | Effect of cyOEF purity | | | | | | |
| 8 | cyOEF | 99% | 0.10% cySTOX | 280 | 14 | 96 | 31.0 | 61.4 |
| 9 | cyOEF | 92% | 0.10% cySTOX | 280 | 4 | 95 | 14.2 | 30.3 |
| 10 | cyOEF | 88% | 0.10% cySTOX | 280 | 5 | 95 | 9.3 | 20.3 |
| | | Effect of temperature | | | | | | |
| 11 | cyOEF | 99% | 0.10% cySTOX | 260 | 25 | 96 | 40.4 | 79.2 |
| 12 | cyOEF | 99% | 0.10% cySTOX | 240 | 120 | 92 | 21.8 | 40.2 |
| | | Effect of initiator content | | | | | | |
| 13 | cyOEF | 99% | 0.05% cySTOX | 260 | 120 | 65 | 36.6 | 68.6 |
| 14 | cyOEF | 99% | 0.20% cySTOX | 260 | 20 | 96 | 26.9 | 50.9 |
| 15 | cyOEF | 99% | 0.30% cySTOX | 260 | 10 | 95 | 15.0 | 25.1 |
| | | Discoloration studies | | | | | | |
| 16 | cyOEF | 95% | 0.10% $SnOct_2$ | 280 | 90 | 94 | 8.7 | 13.0 |
| 17 | cyOEF | 95% | 0.10% $SnOct_2$ | 220 | 90 | 56 | 12.3 | 19.7 |
| 18 | cyOEF | 97% | 0.10% cySTOX | 280 | 60 | 93 | 9.4 | 13.6 |
| 19 | cyOEF | 99% | 0.10% cySTOX | 280 | 60 | 96 | 14.8 | 28.1 |
| | | Other catalysts | | | | | | |
| 20 | cyOEF | 99% | 0.20% $Sb_2O_3$ | 280 | 180 | 96 | 32.4 | 71.5 |
| 21 | cyOEF | 99% | 0.30% $Bi_2O_3$ | 260 | 240 | 32 | 29.1 | 71.2 |
| 22 | cyOEF | 99% | 0.15% FeAc | 270 | 90 | 95 | 15.0 | 28.7 |
| 23 | cyOEF | 99% | 0.30% ZnAc | 280 | 120 | 90 | 12.0 | 21.9 |
| 24 | cyOEF | 99% | 1.0% $Ca(MeO)_2$ | 280 | 120 | 90 | 17.6 | 32.7 |

Fig.13

PROCESS TO PREPARE POLYESTER POLYMER AND POLYESTER POLYMER OBTAINABLE THEREBY

CROSS-REFERENCE TO RELATED APPLICATION

This application is a U.S. National Stage application of International Application No. PCT/EP2017/074485, filed Sep. 27, 2017, which claims priority to European Patent Application No. 16191553.3, filed Sep. 29, 2016, European Patent Application No. 17167599.4, filed Apr. 21, 2017, and European Patent Application No. 17167601.8, filed Apr. 21, 2017, the contents of each of which are hereby incorporated herein by reference.

BACKGROUND

Field of the Invention

The present invention relates to a process to prepare a polyester polymer from a cyclic polyester oligomer composition comprising a cyclic polyester oligomer having furanic units, and the polymer obtainable thereby.

Biobased polymers having aromatic building blocks are highly sought today due to their environmental friendliness and good mechanical properties. An interesting class of biobased aromatic monomers are the furanics such as furan-2,5-dicarboxylic acid (FDA), 5-(hydroxymethyl)furan-2-carboxylic acid (HMFA), and 2,5-bis(hydroxyl methyl)furan (BHMF), which may be prepared from the intermediates furfural (2-furan carboxaldehyde) and 5-hydroxymethyl 2-furan carboxaldehyde (HMF) which may be produced by the acid-catalyzed thermal dehydration of pentoses (C5) and hexoses (C6). The chemical similarity of the furan ring to the phenyl ring makes it possible to replace phenyl-based polymers such as polyethylene terephthalate (PET) by furan-based polymers.

Background of the Invention

The production of polyesters from furanic building blocks by polycondensation reactions involving heating a mixture of diols and diacids or diesters (monomers) at high temperatures in the presence of organometallic or acid catalyst is known, for example, from U.S. Pat. Nos. 2,551,731 and 8,143,355 B2. To allow the progress in this equilibrium reaction towards the formation of the polymer, the formed water or side products such as alcohol must be removed, typically by reduced pressure or gas streams at elevated temperatures in the process. Therefore, complex and costly reaction and devolatilization equipment are required. If the polycondensation and devolatilization is insufficient, then high molecular weight polyester having useful mechanical and other properties will not be produced. Furthermore, the high temperatures and long residence times lead often to undesired side reactions such as degradation of the monomer, oligomer or polymer, formation of intermolecular bonds leading to branching, and oxidation of the final product with the consequent color development.

Recently new alternative raw materials to the diol and diacid or diester monomers conventionally used to prepare polyesters from furanic building blocks in industrial scale polymerization plants have been developed. WO2014/139603 (A1) discloses that cyclic polyester oligomers may be readily prepared in a process comprising the step of reacting a monomer component in a ring closing oligomerization step under conditions of a reaction temperature and reaction time sufficient to yield a cyclic polyester oligomer having furanic units. Such cyclic polyester oligomers advantageously do not produce large quantities of water or alcoholic side products nor do they require complex reaction and high-capacity devolatilization equipment or harsh high temperature reaction and devolatization steps in order to drive the polymerization to completion as disclosed in WO2014/139602 A1.

Nonetheless low levels of diacid, diol and acidol monomeric and/or dimeric and/or oligomeric species are present at equilibrium in the cyclic polyester oligomer of WO '603, and it was reported that they should be removed so that they would not detrimentally affect the storage stability of the oligomer or its subsequent polymerization processing behavior. It was disclosed that these undesired impurities could be removed from the oligomer product by conventional methods such as chromatography, selective precipitation, distillation, extraction, and crystallization, and a combination of filtration and chromatography was taught by example. Although such purification methods are effective, it is nonetheless desirable to have ones that are as—or preferably more—effective and selective and that do not require large quantities of solvents, long times or hybrid combinations, particularly for large-scale commercial production.

Although the production of polyester polymers by melt polymerization from such cyclic oligomers has been shown to be possible under milder thermal conditions (minimizing color and degradation) and with simpler equipment than polycondensation reactions in WO '602, nonetheless some cyclic oligomeric species have quite high melting points. For example, the often dominant cyclic dimer has a melting point of about 370° C. Thus, although such oligomeric compositions may readily polymerize at milder temperatures below 300° C., significantly higher temperatures and harsher conditions may be required to melt the raw materials prior to their polymerization thereby causing degradation and discoloration of the thermally sensitive partially aliphatic oligomers.

In conclusion, it would be desirable to have improved processes to both produce such cyclic polyester oligomers as well as to polymerize them.

SUMMARY

It has been discovered that, in order to address the previously mentioned deficiencies, an improved process is needed to prepare a polyester polymer having furanic units from a cyclic polyester oligomer composition comprising a cyclic polyester oligomer having furanic units.

In view of the state of the known technology, one aspect of the present disclosure is to provide a process to prepare a polyester polymer comprising performing a ring-opening polymerization of a cyclic oligomer composition in the presence of a plasticizer. The cyclic oligomer composition comprises a cyclic polyester oligomer having furanic units.

The term "furanic units" as used herein refers to furan derivatives such as those based on the monomers FDA, HMFA, BHMF and their partially or fully reacted monoester or diester derivatives. Having furanic units means that the fully or partially reacted derivative of such monomers is incorporated into the polyester polymer or cyclic polyester oligomer.

The term "plasticizer" as used herein refers to a compound which is capable of decreasing the melting point and/or the viscosity of a cyclic polyester oligomer having furanic units, preferably a cyclic dimer.

The presence of the plasticizer has several beneficial effects. First of all, some of the cyclic species, such as the cyclic dimer, have quite high melting points, which the presence of the plasticizer then effectively reduces. Thus, most cyclic oligomer compositions will not melt at preferred temperatures below 300° C., above which the thermal degradation of both the oligomers and their polymer product cause significant color formation and reduction of the achieved molecular weight in the polymer product. The plasticizer beneficially minimizes then the thermal profile (temperature and/or time) of the reactant cyclic oligomer composition during the initial melt up and any holding of the composition prior to its melt polymerization. In addition, the plasticizer facilitates the polymerization of the cyclic oligomer compositions at temperatures well below their melting point and thus under milder conditions.

Furthermore, many of the desirable polymerization catalysts are solids rather than liquids. Examples include cyclic stannoxane, which readily yields high molecular weight polymers for commercial applications, as well as the metal oxides such as $Sb_2O_3$ and $Bi_2O_3$, which provide polymer products having reduced color versus that obtainable with tin-based catalysts. The inert plasticizer facilitates the polymerization by promoting the intimate contacting and mixing between the cyclic oligomer compositions and these solid state polymerization catalysts.

In some embodiments, the amount of plasticizer during the polymerization is sufficient to reduce the melting point of the initial unreacted cyclic oligomer composition by at least 10, preferably 25, more preferably 50, most preferably about 75° C. In other embodiments, the amount of plasticizer during the polymerization is sufficient to reduce the initial melt viscosity of the reaction mixture comprising the cyclic oligomer composition by at least 10, preferably 25, more preferably 50%. In certain other embodiments, the amount of plasticizer is from 1 to 75 mass %, preferably 5 to 60 mass %, more preferably 10 to 50 mass %, most preferably 15 to 40 mass % based on the mass of the initial cyclic polyester oligomer composition. The melt viscosity may be measured using a rheometer according to methods commonly known in the art.

In one embodiment, the plasticizer is at least one selected from the group consisting of: a supercritical fluid, an optionally-substituted phenyl ether, an ionic liquid, an optionally-substituted xylene, a polyether, and mixtures thereof.

In another embodiment of the process, the supercritical fluid is carbon dioxide or the polyether is a glyme. The glyme is preferably tetraethylene glycol dimethyl ether.

In an alternative embodiment, the plasticizer is a polyester polymer of the cyclic polyester oligomer, preferably a PEF polymer, preferably one having a molecular weight of about 15,000 to 30,000 g/mol (melting point about 220° C.), or a PEF oligomer, preferably one having a molecular weight of about 1,000 to less than about 15,000 g/mol. The previously stated molecular weights are measured by SEC relative to polystyrene standards. In yet another embodiment, mixtures of any of the above-mentioned plasticizers are used.

In one aspect of the present disclosure, the ring-opening polymerization in the presence of a plasticizer as described above and disclosed in this application may also be carried out on known cyclic oligomer compositions comprising a cyclic polyester oligomer having furanic units, such as those disclosed in EP2931784 (A1).

In yet another aspect of the present disclosure, the polymerization is carried out in the presence of one or more anti-oxidants such as substituted phenols and derivatives of phenylenediamine. Suitable anti-oxidants include IRGANOX 1098, which is the trade name for benzenepropanamide, N,N'-1,6-hexanediylbis[3,5-bis(1,1-dimethylethyl)-4-hydroxy; a sterically hindered phenolic antioxidant such as IRGANOX 1076, which has the formula Octadecyl-3-(3,5-di-tert.butyl-4-hydroxyphenyl)-propionate.

According to an embodiment, the related objects are achieved by a process to prepare a cyclic polyester oligomer composition comprising a cyclic polyester oligomer having furanic units, wherein the process comprises:

a reaction step of either: (I) reacting a monomer component $C^1$ or $D^1$ in the presence of an optional catalyst and/or optional organic base in a ring closing oligomerization step under conditions of a reaction temperature and reaction time sufficient to yield a cyclic polyester oligomer having furanic units of structure $Y^1$, wherein the monomer component $C^1$ comprises the structure

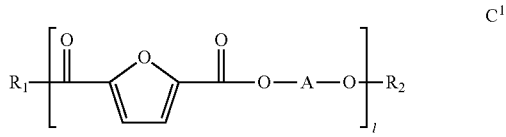

and wherein each of the groups A is an optionally-substituted linear, branched or cyclic alkyl, phenyl, aryl, or alkylaryl, and wherein l is an integer from 1 to 100, preferably 2 to 50, most preferably 3 to 25, and wherein $R_1$=OH, OR, halogen, or O-A-OH, R=optionally substituted linear, branched or cyclic alkyl, phenyl, aryl or alkylaryl, $R_2$=H or

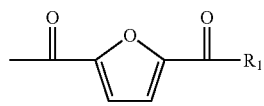

wherein the monomer component $D^1$ comprises the structures

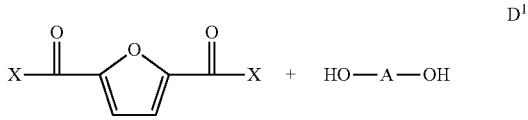

and wherein A is an optionally-substituted linear, branched or cyclic alkyl, phenyl, aryl, or alkylaryl, and wherein each of the groups X is an OH, a halogen, or an optionally-substituted alkyloxy, phenoxy, or aryloxy, and wherein the groups X are not OH when A is n-butyl, and wherein the structure $Y^1$ of the cyclic polyester oligomer having furanic units is

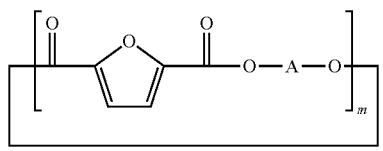

$Y^1$ wherein m is an integer from 1 to 20, preferably 2 to 15, most preferably 3 to 10, or (II) reacting a monomer component $C^2$ or $D^2$ in the presence of an optional catalyst and/or optional organic base in a ring closing oligomerization step under conditions of a reaction temperature and reaction time sufficient to yield a cyclic polyester oligomer having furanic units of structure $Y^2$, wherein the monomer component $C^2$ comprises the structure

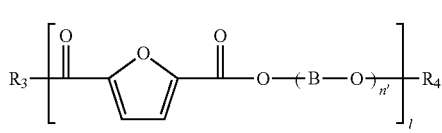

$C^2$ and wherein each of the groups B is an optionally-substituted linear, branched or cyclic alkyl, phenyl, aryl, or alkylaryl, wherein l is an integer as defined above, and wherein n' is an integer from 1 to 20, preferably 2 to 10, and wherein
$R_3$=OH, OR, halogen, or O—(B—O)$_{n'}$—H,
R=optionally substituted linear, branched or cyclic alkyl, phenyl, aryl or alkylaryl,
$R_4$=H or

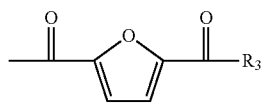

wherein the monomer component $D^2$ comprises the structures

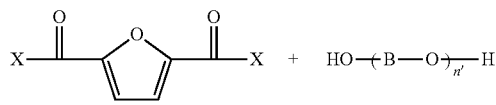

$D^2$ and wherein each of the groups X is an OH, a halogen, or an optionally-substituted alkyloxy, phenoxy, or aryloxy, each of the groups B is an optionally-substituted linear, branched or cyclic alkyl, phenyl, aryl, or alkylaryl, and n' is an integer as defined above, and wherein the structure $Y^2$ of the cyclic polyester oligomer having furanic units is

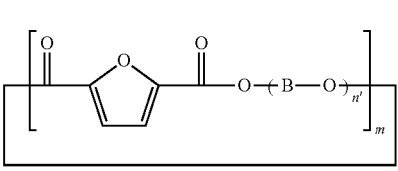

$Y^2$ wherein each of the groups B is an optionally-substituted linear, branched or cyclic alkyl, phenyl, aryl, or alkylaryl, n' is an integer as defined above, and m is an integer from 1 to 20, preferably 2 to 15, most preferably 3 to 10, and a separation step (III) in which linear oligomeric polyester species having furanic units are separated and removed from the cyclic oligomeric composition, wherein the reacting of the monomer component C1 or D1 or C2 or D2 in the presence of an optional catalyst and/or optional organic base in a ring closing oligomerization step is carried out in the presence of a solvent, wherein the solvent is selected from the group consisting of an ionic liquid, an optionally-substituted napthalene, optionally-substituted aromatic compound, and their mixtures, and optionally in the presence of a zeolite and absorbing impurities onto the zeolite, and the separation step (III) in which linear oligomeric polyester species having furanic units are separated and removed from the cyclic oligomeric composition comprises one or more of the following sub-steps: adding a zeolite and absorbing impurities onto the zeolite, cooling the cyclic oligomeric composition in order to precipitate out cyclic polyester oligomers having furanic units, adding an antisolvent in order to precipitate out cyclic polyester oligomers having furanic units, and separating zeolites having absorbed impurities from the cyclic oligomeric composition.

Such cyclic polyester oligomer compositions are well suited for use in the polymerization process in the presence of plasticizer in the present invention.

Other further objects are achieved firstly by a cyclic polyester oligomer composition obtainable by said process, wherein the composition contains less than 5, preferably 3, most preferably 1 weight % of linear oligomeric polyester species based on the total weight of the composition.

Said cyclic polyester oligomer composition is used in accordance with an embodiment in the production of a polyester polymer by polymerization in the presence of a plasticizer.

In another embodiment, some of these further objects are achieved by means of a process to prepare a cyclic oligomer composition comprising a cyclic polyester oligomer having furanic units and having either structure $Y^1$ or $Y^2$. These cyclic oligomers advantageously are readily prepared with a high purity in relatively simple and scalable processes in a high conversion and with a low content of linear monomeric or oligomeric species having alcoholic and/or acidic end groups.

These results are first of all surprisingly achieved by carrying out the cyclization reaction in the presence of a solvent. The use of solvent strongly favours the formation cyclic oligomers at much lower conversion levels of end groups in dilute reaction systems versus that of bulk systems. Without wishing to be bound by a particular mechanism, the inventors believe this effect may be due to the presence of the solvent influencing the competition between the two independent reversible reactions of step growth polymerization and cyclization. The higher boiling aromatic solvents have been found to provide good solubility, but preferably the more volatile ones such as xylenes are selected in order to ease their subsequent removal.

The use of zeolites has been found to be particularly effective in removing linear monomeric and oligomeric species versus cyclic species due to the more flexible structure and smaller cross-sectional area of the linear species. In particular, zeolites offer the possibility to tailor their selectivity for linear versus cyclic species and even for various chain lengths. This aspect is particularly beneficial when the achieved purity is greater than 99%, as then the need for anti-solvents and their subsequent removal is eliminated. Furthermore, the zeolites have been found to be a more robust and physically and chemically stable absorption medium than silica gel, particularly at higher temperatures (e.g. 200° C.) in the typical cyclization reaction solvent systems. Advantageously the zeolite may thus be added at or near the end of the cyclization or at an earlier intermediate stage of the process. The zeolite may even be present in the initial monomer solution prior to its cyclization. Adding the zeolite at the end of the cyclization process is preferred, for example, after a weight fraction of cyclic oligomers to total oligomers of 0.6, preferably 0.7, more preferably 0.8, most preferably 0.9 is reached, as then both remaining unreacted monomers as well as linear oligomers are removed.

The cyclic oligomers tend to have a lower solubility in the solvent than the linear oligomers or especially the monomers or other low molecular weight species (less than 100 g/mol) having acidic and/or alcoholic functional groups. Thus, the cyclic may additionally or alternatively be removed by cooling the reaction product mixture and/or adding an anti-solvent. Cooling the mixture so that the cyclic species precipitate earlier is often preferred, as most anti-solvents do not have a high selectivity for the cyclic versus linear species.

The term "optionally-substituted" as used herein refers to chemical substituents that are different from hydrogen, alkyl, aryl or alkylaryl groups. Such optional substituents will be generally inert during the ring-closing oligomerization step and may be for example, halogens or ethers.

The term "catalyst" as used herein refers to an inorganic or metal-containing compound such as an organometallic species or a metal salt; whereas an "organic base" refers to a non-metallic and basic organic species.

In another embodiment of the process, the optional catalyst is either absent or it is present as a metal alkoxide or metal carboxylate, preferably one of tin, zinc, titanium, calcium, iron, aluminium or their mixtures. The lack of a catalyst reduces the cost of raw materials and simplifies the purification and further use of the cyclic polyester oligomer. However, some metal-based catalysts have been found by the inventors to be highly effective in the process of the present disclosure, thus allowing the cyclic polyester oligomer compositions to be prepared under relatively mild conditions of temperature and time. This then improves productivity and minimizes degradation and discoloration in the process. In addition, in some embodiments, a non-metallic catalyst is used. For example, non-metallic catalysts such as those used for PLA production from lactide may be used. In some embodiments, the non-metallic catalyst may be selected from one or more of the group consisting of N-heterocyclic carbenes (NHC); tris(pentafluorophenyl)borane ($B(C_6F_5)_3$); 1,3,4-triphenyl-4,5-dihydro-1H-1,2,4-triazol-5-ylidene carbine; and DMAP/DMAP.HX (where $XH=CF_3SO_3H$, $CH_3SO_3H$, HCl, $(F_3CSO_2)_2NH$) or DMAP/DMAPCH$_3$.X (where X=I—, —PF$_6$).

In one embodiment of the process, the optional organic base E is present in a stoichiometric ratio of from 0.5 to 6, preferably 1 to 4, more preferably 2 to 3 mol relative to 1 mol of all monomer component species used as a reactant in the process. The use of such optional organic base loading has been found to allow the ring-closing oligomerization to take place under relatively mild conditions of temperature and time while avoiding the catalysis of undesired side reactions during the process. Furthermore, contamination is avoided of the polyester oligomer composition product by large quantities of unquenched residual catalysts, which may lead to degradation and/or discoloration in subsequent thermal processing such as polymerization or extrusion or molding of the resulting polymer. An effective balance between catalyst cost and productivity is also obtained.

In one embodiment of the solvent of the process, the ionic liquid is an ionic liquid in which the cation does not contain acidic protons, more preferably the ionic liquid is N-methyl-N-alkylpyrrolidinium bis(trifluoromethanesulfonyl)imide ($PYR_{1R}TFSI$).

In another embodiment of the solvent of the process, the optionally-substituted napthalene is selected from the group consisting of naphthalene, 1-methylnaphthalene, and 2-methylnaphthalene.

In yet another embodiment of the solvent of the process, the optionally-substituted aromatic compound is diphenyl ether, dichlorobenzene, or a xylene, preferably p-xylene.

In an embodiment of the process, the zeolite is selected from either Zeolite Y or Zeolite B and the impurities absorbed comprise one or more linear oligomeric polyester species having furanic and/or alcoholic units. Optionally linear monomeric acid/ol, diacid, diester, or diol species, as well as other low molecular weight (less than 100 g/mol) impurities having acidic or alcoholic groups are preferably also removed. In still a preferred embodiment of the process, the ratio of silica over alumina of the zeolite ($SiO2/Al2O3$ in mol/mol) is larger than 5, preferably larger than 20, even more preferably larger than 40.

In the sub-steps of separation step (III) in which linear oligomeric polyester species having furanic units are separated and removed from the cyclic oligomeric composition, the added zeolite and absorbed impurities may be those described above.

The sub-step of cooling of the cyclic oligomeric composition in order to precipitate out cyclic polyester oligomers having furanic units is preferably carried out under temperature and time conditions of 50 to 125° C. and 5 to 180 min, preferably 60 to 110° C. and 30 to 120 min, more preferably 80 to 100° C. and 45 to 90 min.

The sub-step of adding an antisolvent in order to precipitate out cyclic polyester oligomers having furanic units is carried out by adding an antisolvent selected from one or more of hydrocarbons or monoesters in amounts of 5 to 95, preferably 25 to 75, more preferably 30 to 60 weight %. In some embodiments, the hydrocarbon is an alkane, preferably hexane, and the ester is a salicylate, preferably a methyl salicylate.

The sub-step of separating zeolites having absorbed impurities from the cyclic oligomeric composition is preferably carried out by means of one or more of the following methods: filtration, sedimentation, and centrifugation. Alternatively, the zeolites are immobilized on a solid support, for example, packed into a column, and they are contacted with the solution by passing the solution as a fluid phase through the column.

The separation step (III) in which linear oligomeric polyester species having furanic units are separated and removed from the cyclic oligomeric composition may comprise one or more additional separation sub-steps of passing a mobile phase of the cyclic oligomeric composition through a stationary phase, selective precipitation, distillation, extraction, crystallization, or combinations thereof.

Another embodiment concerns a cyclic polyester oligomer composition obtainable by a process according to the invention, wherein the composition contains: (i) a residual solvent in a concentration of less than 5, preferably 2, more preferably 1 wt %, and the residual solvent is selected from the group consisting of an ionic liquid, an optionally-substituted napthalene, optionally-substituted aromatic compound, and their mixtures; (ii) linear oligomeric polyester species having furanic units and present in a concentration of less than 5%, preferably 3, most preferably 1 wt %; and (iii) optionally a zeolite, in a concentration of less than of less than 5, preferably 2, more preferably 1 wt %, wherein the weight percentages are relative to the total weight of the cyclic polyester oligomer composition.

The linear oligomeric polyester species having furanic units according to an embodiment typically contain from 2 to 50, preferably 2 to 20, more preferably 2 to 10 monomeric repeat units (an ester linkage is formed by a reaction of a diacid or diester monomer and a diol). The composition containing such low levels of linear species is advantageous in that the subsequent polymerization may be carried out efficiently and reproducibly. Large and/or variable levels of linear species in the cyclic oligomer composition may change the subsequent polymerization stoichiometry and thus affect the obtainable molecular weight upon polymerization. In addition, acidic, alcoholic, or ester end groups of linear oligomeric or monomeric species may react to disadvantageously release volatile species during polymerization. Furthermore, reactive acidic species may act to quench the basic catalysts and/or be corrosive to processing equipment.

In an embodiment of the composition, the content of residual monomer components, such as $C^1$, $D^1$, $C^2$, or $D^2$, in the cyclic polyester oligomer composition is less than 5, preferably 3, and most preferably 1 weight percent based on the total weight of the composition.

In an embodiment of the cyclic polyester oligomer composition, the cyclic polyester oligomer composition contains a halogenated impurity, preferably an acid chloride and/or its residue. A residue is defined here as a reaction product or byproduct, for example, a halogen acid such as HCl or a halogen salt such as a chloride salt. Such impurities are a byproduct of the use of acid halide reactants, such as acid chlorides, which have both more favourable kinetics and equilibrium in the production of the oligomer composition than does the reaction of a carboxylic acid with an alcohol. However, halogenated species may be corrosive and thus require special expensive construction materials for the subsequent polymerization plant. Therefore, their content in the cyclic polyester oligomer composition will preferably be kept low, e.g. by removal during the subsequent separation and removal step.

In another embodiment of the cyclic polyester oligomer composition, the composition comprises the specific cyclic polyester oligomer having furanic units and of structure $Y^{1'}$

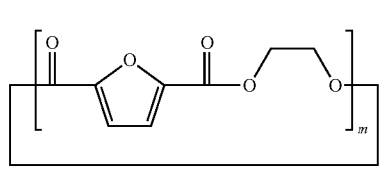

wherein m is an integer from 1 to 20, preferably 2 to 15, most preferably 3 to 10. This embodiment is a suitable raw material for producing poly(2,5-ethylene furandicarboxylate) (PEF), and thus has the advantages previously discussed in relationship to the process to produce this oligomer composition.

In an alternative embodiment of the cyclic polyester oligomer composition, the composition comprises the specific cyclic polyester oligomer having furanic units and of structure $Y^{1''}$

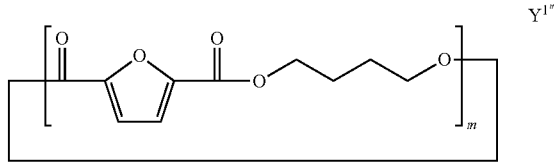

wherein m is an integer from 1 to 20, preferably 2 to 15, most preferably 3 to 10. This embodiment is a suitable raw material for producing poly(2,5-ethylene furandicarboxylate) (PBF), and thus has the advantages previously discussed in relationship to the process to produce this oligomer composition.

Another embodiment is a process to produce a polyester polymer comprising (i) the process of preparing a cyclic oligomer composition comprising a cyclic polyester oligomer having furanic units according to the present disclosure, together with (ii) a subsequent polymerization step to produce a polyester polymer.

In an embodiment of the process, the subsequent polymerization is carried out in the presence of a plasticizer. In an alternative embodiment, the subsequent polymerization in the presence of a plasticizer is carried out on a cyclic oligomer composition obtainable, preferably obtained, by processes known in the art, preferably as disclosed in the earlier discussed WO2014/139603.

A related embodiment is the use of the cyclic polyester oligomer composition disclosed herein in the production of a polyester polymer. This polymerization process and use advantageously utilize the desirable properties of the oligomer composition as a raw material in a polymerization process, such as the favourable kinetics, lack of corrosive acidic species, and lack of formation of significant quantities of volatile species during the polymerization.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one process claim may be combined with the subject matter of one or more other process claims or the subject matter of one or more composition claims or the subject matter of a mixture of one or more process claims and composition claims. By analogy, the subject matter of any one composition claim may be combined with the subject matter of one or more other composition claims or the subject matter of one or more process claims or the subject matter of a mixture of one or more process claims and system claims. One skilled in the art will also understand that the combination of the subject matters of the various embodiments of the invention is also possible without limitation in the invention to the extent that such combinations are technically feasible.

BRIEF DESCRIPTION OF THE DRAWINGS

The invention will be explained in more detail hereinafter with reference to the drawings:

FIG. 8 shows a table of melting points of various cyclic PEF polyester oligomer and PEF polymer species and compositions

FIG. 13 shows a table of selected results of ROP for the synthesis of PEF using a plasticizer amount of 50% mass per mass cyOEF

DETAILED DESCRIPTION OF THE EMBODIMENTS

Figure 1:
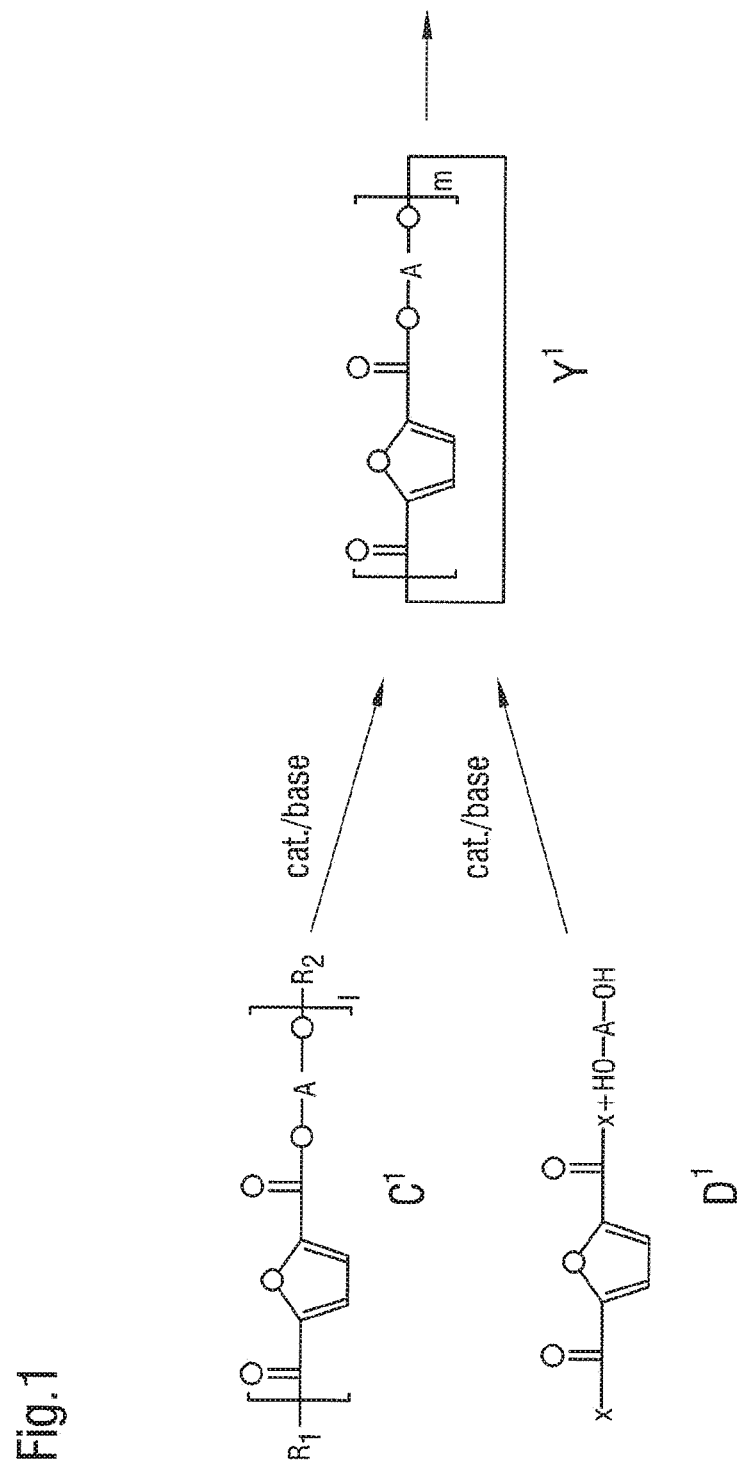
FIG. 1 shows a reaction scheme for the synthesis of a cyclic polyester oligomer having furanic units of structure $Y^1$ from the reaction of a monomer component $C^1$ or $D^1$ in a ring closing oligomerization step.

The claimed invention relates to a process to prepare a polyester polymer from a cyclic polyester oligomer composition comprising a cyclic polyester oligomer having furanic units, such as those known from WO2014/139603 (A1), which is hereby incorporated by reference. The present invention also relates to such cyclic polyester oligomer compositions comprising a cyclic polyester oligomer having furanic units.

The present invention concerns a process to prepare a polyester polymer comprising a ring-opening polymerization of a cyclic oligomer composition comprising a cyclic polyester oligomer having furanic units, wherein the ring-opening polymerization is carried out in the presence of a plasticizer.

In one embodiment, the cyclic polyester oligomer composition comprises one or more cyclic polyester oligomers (cyOEF) having furanic units of the structure:

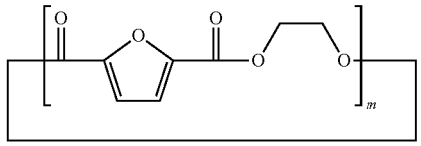

wherein m is typically an integer from 1 to 20, and the composition is used for the production of a PEF polymer or copolymer.

In another embodiment, the cyclic polyester oligomer composition comprises one or more cyclic polyester oligomers (cyOBE) having furanic units of the structure:

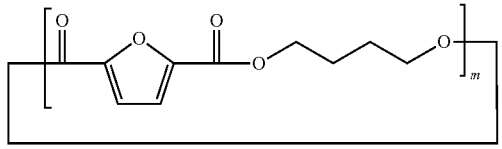

wherein m is typically an integer from 1 to 20, and the composition is used for the production of a PBF polymer or copolymer.

The use of a plasticizer has been found to be most beneficial in compositions having larger contents of high melting cyclic species, such as the dimeric species in which m is 2 for cyOEF or cyOEF. The amount of the dimeric species in the composition in various embodiments will be at least 40, 60 or 80 wt %.

In some embodiments, the ring-opening polymerization in the presence of plasticizer will be used to prepare a PEF or PBF polymer or copolymer of a higher molecular weight, for example, for the production of plastic bottles. In some such embodiments, the number average molecular weight, Mn, will be at least 25,000, preferably 30,000, more preferably 35,000 Dalton. In other such embodiment, the intrinsic viscosity will be at least 0.6, preferably 0.7, more preferably 0.85 dL/g.

In alternative embodiments, the ring-opening polymerization in the presence of plasticizer will be used to prepare a PEF or PBF polymer or copolymer of a lower molecular weight, for example, for the production of textile, film, sheet or tires. In some such embodiments, the number average molecular weight, Mn, will be from about 10,000 to about 25,000, preferably from about 12,000 to about 22,000, more preferably from about 15,000 to about 20,000 Dalton. In other embodiments, the intrinsic viscosity will range from 0.40 to 0.70, 0.72 to 0.98, 0.60 to 0.70 or 0.70 to 1.00 dL/g.

The reaction temperature for the ring-opening polymerization in the presence of plasticizer will typically be in the range of about 220 to about 300, preferably about 230 to about 290, more preferably about 240 to about 280° C.

The reaction time for the ring-opening polymerization in the presence of plasticizer will typically be less than 90, preferably 60, more preferably 30 min.

The optimum or preferred amount of plasticizer used will depend somewhat on the type and composition of the plasticizer as well as the specific cyclic oligomer composition, particularly depending on its content of high melting dimeric and other cyclic polyester oligomer species, which only generally melt at temperatures well above the previously described minimum polymerization reaction temperatures and close to or even above the previously described maximum polymerization temperatures. In one embodiment, the high melting species is one or more cyclic polyester oligomers having furanic units and having a melting point of at least 270, 280, 340 or 360° C. Such species include the C2, C3, C4 or C5 (m=2, 3, 4, or 5) cyOEF or cyOBF species. Particularly important is the use of plasticization for compositions containing the dimeric C2 (m=2) species. Nonetheless typical amounts of plasticizer in the ring-opening polymerization will be from about 25 to about 75, preferably about 35 to about 65, more preferably about 40 to 60 wt % of plasticizer relative to the total weight of the cyclic polyester oligomers having furanic units. In certain embodiments involving intimate contact of the cyclic polyester oligomer and the catalyst, such as for reaction in an extruder, typical amounts of plasticizer may be lower, for example, at least 1, 25, or 40 wt % of plasticizer relative to the total weight of the cyclic polyester oligomers having furanic units may be used.

It is noted that such large amounts of plasticizer may have undesirable effects on the physical properties of the resultant polyester polymer product. Therefore, in some embodiments the plasticizer will be at least partially removed by evaporation during the ring-opening polymerization and/or in one or more subsequent devolatilization steps. The liquid tetraglyme may be preferred as plasticizer due to its relatively low boiling point. Other plasticizers having boiling points within the ring-opening polymerization reaction temperature ranges described earlier may also be useful in this respect. In some embodiments, at least 60%, preferably 90% of the plasticizer present at the start of the ring-opening polymerization will be removed during or after the polymerization. In particular embodiments, the content of plasticizer will be beneficially reduced during or after polymerization to levels of less than 1,000, preferably 750, more preferably 500 ppm.

In one embodiment, the cyclic oligomer composition together with catalyst is ground, extruded or otherwise processed so to have a homogenous distribution of catalyst and an intimate contact between the oligomer to be reacted and the catalyst prior to carrying out the ring-opening polymerization. This process of intimate mixing may be carried out in the presence or absence of added plasticizer. In the absence of added liquid plasticizer, the plasticization will be done internally by oligomeric or polymeric polyester species contained within the composition itself. Thus, the polyester polymer itself, such as PEF or PBF, may act as a plasticizer, and typically such polyester plasticizers will have a number average molecular weight, Mn, from about 1000 to about 50,000, preferably from about 10,000 to about 40,000, more preferably from about 15,000 to about 30,000 Dalton. Such polyester polymer plasticizers have the useful benefit that they will not have an extensive negative impact on the physical properties of the polyester polymer product, and thus they may not need to be removed or devolatilized after the ring-opening polymerization.

In one embodiment, the intimate mixing and ring-opening polymerization are carried out in one or more extruders, preferably in a reactive extrusion process.

The cyclic polyester oligomer composition of the current invention is not specifically limited and it may comprise other components in addition to the polyester polymer having furanic units and comprising the structure $Y^1$ or $Y^2$.

For example, the cyclic polyester oligomer composition may additionally comprise small amounts of one or more unreacted and/or unremoved reaction components such as a monomer component (unreacted diacid, diol, or acidol reagents), a catalyst, a templating agent, a base, a catalyst quencher, a solvent, used in the preparation of the cyclic polyester oligomer. The amount of these impurities in the cyclic polyester oligomer will preferably be less than 10, more preferably less than 5, even more preferably less than 3, and most preferably less than 1 weight % based on the total weight of the cyclic polyester oligomer.

In addition, the cyclic polyester oligomer composition may additionally comprise low levels of impurities introduced as a contaminant in one of the reaction components or formed due to a side reaction during the ring-closing oligomerization step or an optional additional step such as a subsequent devolatization step. Examples of such impurities are linear oligomeric polyester species having furanic units. Finally, the cyclic polyester oligomer composition may additionally comprise additional components such as typical monomer additives added during production or prior to use such as stabilizers against oxidation, thermal degradation, light or UV radiation. One skilled in the art will understand that blends with other monomers in order to combine the favorable properties of different monomers are also contemplated as being within the scope of the present invention.

In one embodiment, the content of diacid, diol, or acidol monomers in the cyclic polyester oligomer composition is less than 5 wt %, preferably less than 3 wt %, more preferably less than 1 wt %. In the present application, the content of diacid, diol, or acidol monomers refers to their content as measured by the extraction of soluble species followed by GC-MS analysis.

As shown in FIG. 1, the process of the invention to prepare the cyclic oligomer composition comprising a cyclic polyester oligomer of structure $Y^1$ having furanic units comprises the step of (I) reacting a monomer component $C^1$ or $D^1$ in the presence of an optional catalyst and/or optional organic base in a ring closing oligomerization step under conditions of a reaction temperature and reaction time sufficient to yield a cyclic polyester oligomer having furanic units of structure $Y^1$, wherein the monomer component $C^1$ comprises the structure

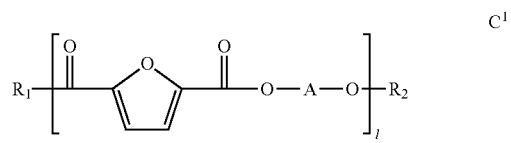

and wherein each of the groups A is an optionally-substituted linear, branched or cyclic alkyl, phenyl, aryl, or alkylaryl, and wherein l is an integer from 1 to 100, preferably 2 to 50, most preferably 3 to 25, and wherein
$R_1$=OH, OR, halogen, or O-A-OH,
R=optionally substituted linear, branched or cyclic alkyl, phenyl, aryl or alkylaryl,
$R_2$=H or

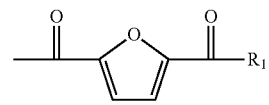

wherein the monomer component $D^1$ comprises the structures

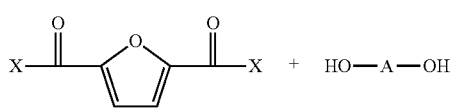

and wherein A is an optionally-substituted linear, branched or cyclic alkyl, phenyl, aryl, or alkylaryl, and wherein each of the groups X is an OH, a halogen, or an optionally-substituted alkyloxy, phenoxy, or aryloxy, and wherein the groups X are not OH when A is n-butyl.

Figure 2:
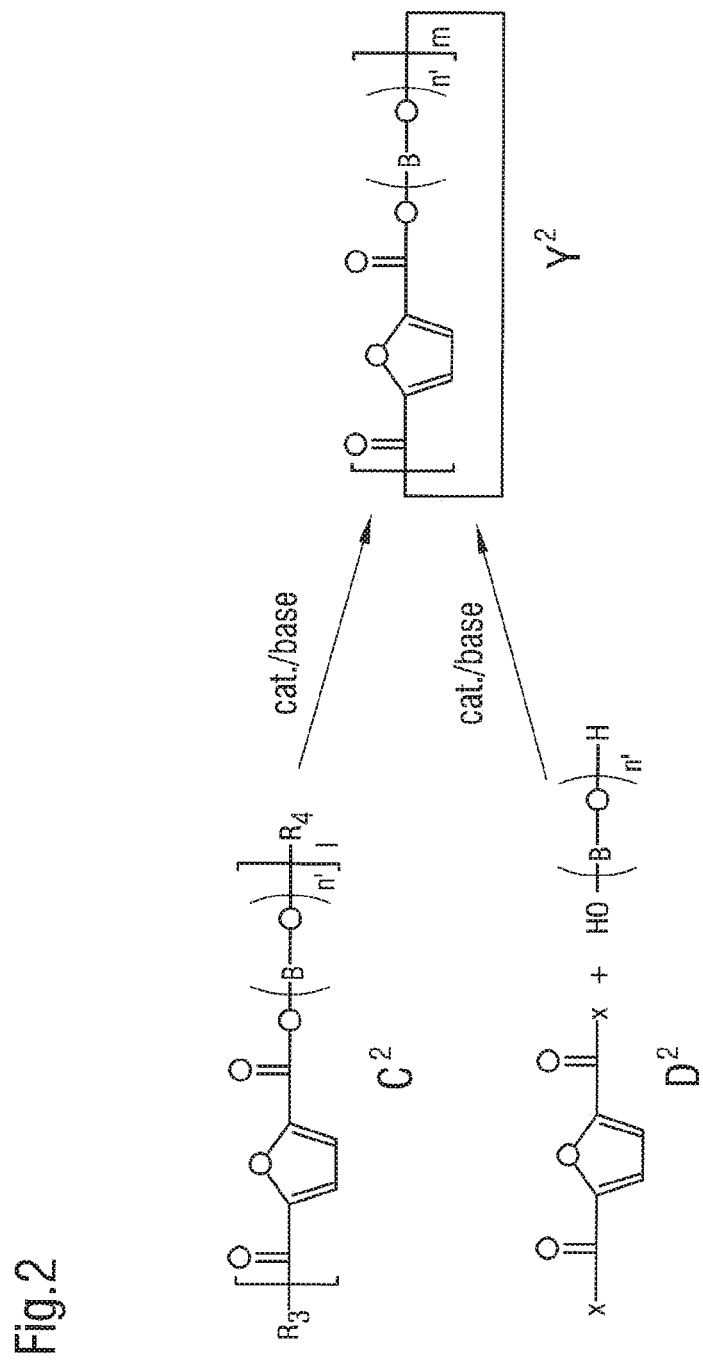
FIG. 2 shows a reaction scheme for the synthesis of a cyclic polyester oligomer having furanic units of structure $Y^2$ from the reaction of a monomer component $C^2$ or $D^2$ in a ring closing oligomerization step.

As shown in FIG. 2, the process of the invention to prepare the cyclic oligomer composition comprising a cyclic polyester oligomer of structure $Y^2$ having furanic units comprises the step of (II) reacting a monomer component $C^2$ or $D^2$ in the presence of an optional catalyst and/or optional organic base in a ring closing oligomerization step under conditions of a reaction temperature and reaction time sufficient to yield a cyclic polyester oligomer having furanic units of structure $Y^2$, wherein the monomer component $C^2$ comprises the structure

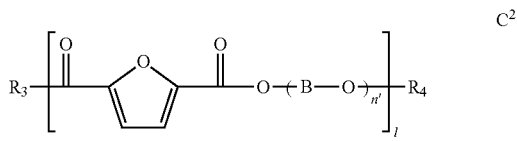

and wherein each of the groups B is an optionally-substituted linear, branched or cyclic alkyl, phenyl, aryl, or alkylaryl, wherein l is an integer as defined above, and wherein n' is an integer from 1 to 20, preferably 2 to 10, and wherein
$R_3$=OH, OR, halogen, or O—(B—O)$_{n'}$—H,
R=optionally substituted linear, branched or cyclic alkyl, phenyl, aryl or alkylaryl,
$R_4$=H or

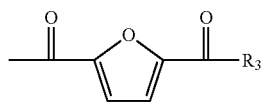

the monomer component $D^2$ comprises the structure

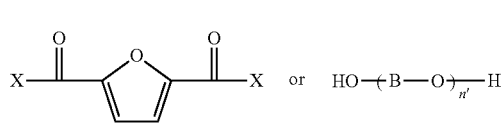

and wherein each of the groups X is an OH, a halogen, or an optionally-substituted alkyloxy, phenoxy, or aryloxy, each of the groups B is an optionally-substituted linear, branched or cyclic alkyl, phenyl, aryl, or alkylaryl, and n' is an integer as defined previously for $Y^2$.

In a step (III) subsequent to either (I) or (II), linear oligomeric polyester species having furanic units are separated and removed from the cyclic oligomeric composition.

Figure 3:
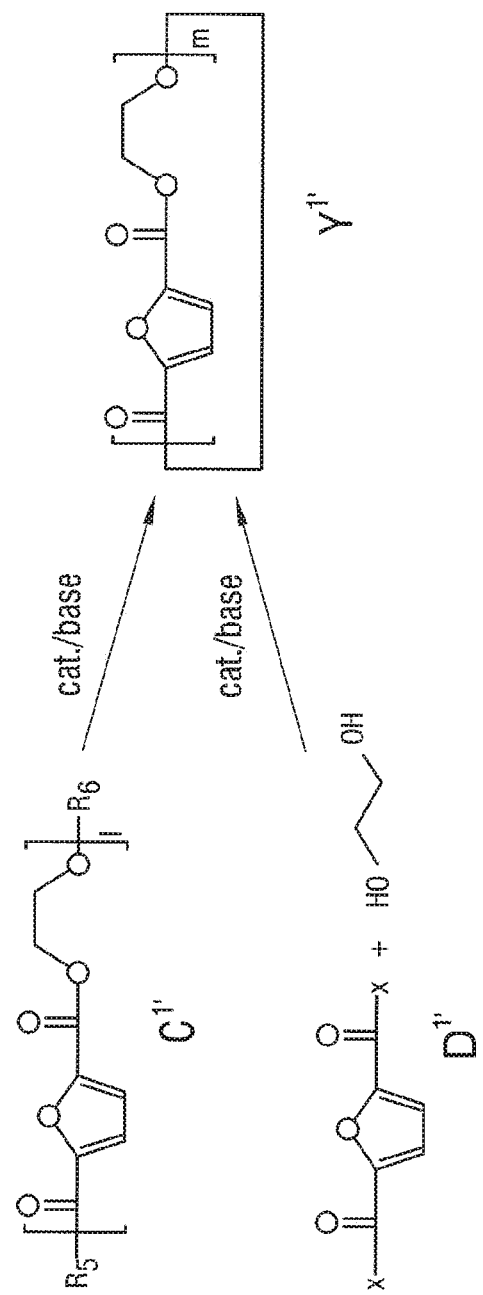
FIG. 3 shows a reaction scheme for the synthesis of a specific cyclic polyester oligomer useful in the production of PEF and having furanic units and of structure $Y^{1'}$ from the reaction of a specific monomer component $C^{1'}$ or $D^{1'}$ in a ring closing oligomerization step.
Figure 4:
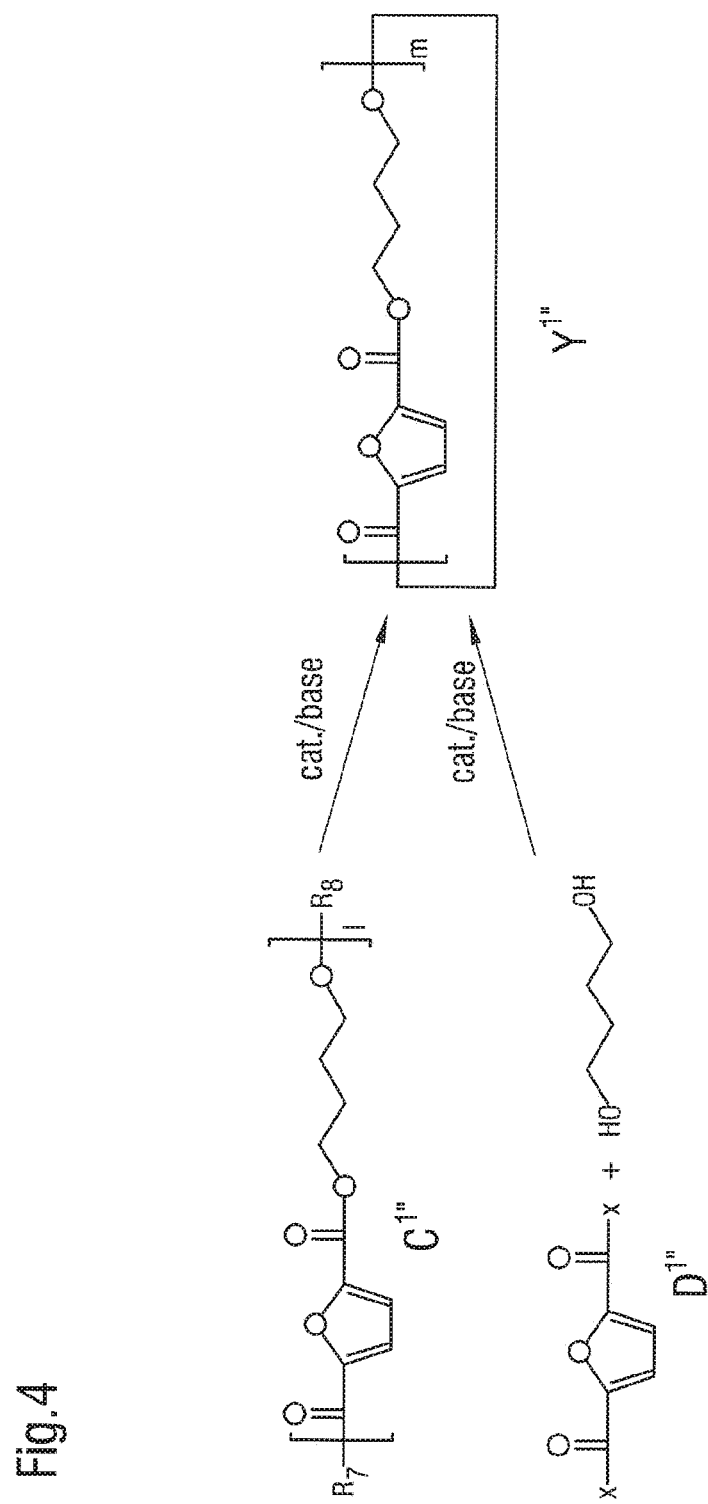
FIG. 4 shows a reaction scheme for the synthesis of a specific cyclic polyester oligomer useful in the production of PBF and having furanic units and of structure $Y^{1''}$ from the reaction of a specific monomer component $C^{1''}$ or $D^{1''}$ in a ring closing oligomerization step.

FIG. 3 shows a reaction scheme for the synthesis of a specific cyclic polyester oligomer useful in the production of PEF and having furanic units and of structure $Y^{1'}$ from the reaction of a specific monomer component $C^{1'}$ or $D^{1'}$ in a ring closing oligomerization step, and FIG. 4 shows a reaction scheme for the synthesis of a specific cyclic polyester oligomer useful in the production of PBF and having furanic units and of structure $Y^{1''}$ from the reaction of a specific monomer component $C^{1''}$ or $D^{1''}$ in a ring closing oligomerization step, wherein 1, m and n are as previously defined for the case of both figures.

Unless specifically indicated otherwise, conventional ring-closing oligomerization processes and their various reagents, operating parameters and conditions, such as that known from WO2014/139603 (A1), may be used in the processes according to the invention in preparing the cyclic polyester oligomers having the structures $Y^1$, $Y^2$, $Y^{1'}$, or $Y^{1''}$.

The conditions of a reaction temperature and reaction time sufficient to yield a cyclic polyester oligomer having furanic units in the ring-closing oligomerization step are not specifically limited. Sufficient here means that the reaction temperature and time are sufficient to cause a ring-closing reaction to occur such that an oligomer having the claimed values of m is produced from the monomer components. One skilled in the art will understand that appropriate specific reaction temperatures and reaction times may vary somewhat due to the interaction between the reaction temperature and time.

For example, increasing the reaction temperature may allow the reaction to take place in a shorter time, or increasing the reaction time may allow lower reaction temperatures to be used. Lower reaction temperatures and/or shorter reaction times may be appropriate if a lower molecular weight cyclic polyester oligomer is to be produced and/or a lower conversion of monomer component to oligomer may be tolerated. Alternatively, higher reaction temperatures and/or longer reaction times may be appropriate if a higher molecular weight cyclic polyester oligomer is to be produced and/or a higher conversion of monomer component is desired.

Furthermore the use of more effective catalysts or bases or a higher concentration of catalyst or organic base may allow milder reaction conditions (e.g. lower reaction temperatures and shorter reaction times) to be used. Conversely the presence of impurities, particularly catalyst-quenching or chain-stopping impurities may require more intensive reaction conditions.

In one embodiment the cyclization reaction temperature is from 100 to 350, preferably 150 to 300, most preferably 180 to 280° C., and the reaction time is from 30 to 600, preferably 40 to 400, most preferably 50 to 300 minutes. In certain specific embodiments, the various specific temperature and time range combinations obtained by combining any of these disclosed ranges may be used. In a more preferred embodiment, these temperature and/or time ranges are used in the ring closing oligomerization step with monomer components $C^1$ or $C^2$.

In another embodiment the cyclization reaction temperature is from −10 to 150, preferably −5 to 100, most preferably 0 to 80° C., and the reaction time is from 5 to 240, preferably 10 to 180, most preferably 15 to 120 minutes. In certain specific embodiments, the various specific temperature and time range combinations obtained by combining any of these disclosed ranges may be used. In a more preferred embodiment, these temperature and/or time ranges are used in the ring closing oligomerization step with monomer components $D^1$ or $D^2$.

In the execution of the present invention, any catalyst which is able to catalyze the ring-closing oligomerization to form cyclic polyester oligomers may be used. Suitable catalysts for use in the present invention are those known in the art for polymerization of cyclic esters, such as an inorganic base, preferably a metal alkoxide, a metal carboxylate, or a Lewis acid catalyst. The Lewis acid catalyst may be a metal coordination compound comprising a metal ion having more than one stable oxidation state. Of this class of catalysts, the tin-or zinc-containing compounds are preferred, of which their alkoxides and carboxylates are more preferred, and tin octoate is the most preferred catalyst.

The ring-closing oligomerization step preferably takes place in the presence of an optional organic base. The organic base is not specifically limited, and, it may be an inorganic or organic base. In one embodiment, it has the general structure E, and in other embodiments it is an alkyl amine such as triethylamine or it is pyridine. In still other embodiments, it is a combination of E and an alkyl amine. In this application, a "catalyst" refers to an inorganic or metal-containing compound such as an organometallic species or a metal salt; whereas an "organic base" refers to a non-metallic and basic organic species.

Specific combinations of catalysts and bases may be particularly effective, and their use may be preferred. In one preferred embodiment, the catalyst is a tin, zinc, titanium, or aluminum alkoxide or carboxylate, and the organic base is DABCO (CAS No. 280-57-9) or DBU (CAS No. 83329-50-4), preferably together with triethyl-amine. The monomer component may be in the solid phase when it is mixed with the catalyst and/or organic base. However, bringing the monomer component into the molten phase or a liquid phase using a solvent and then adding the catalyst and/or organic base afterwards is preferred.

The amount of catalyst and/or organic base in the process of the invention is not specifically limited. In general, the amount of catalyst and/or organic base is sufficient to cause a ring-closing oligomerization step to occur for the selected reaction temperature and time such that an oligomer having the claimed values of 1 is produced from the monomer components. In one embodiment, the catalyst and/or organic base is present, and the catalyst is present in an amount relative to the total weight of the monomer components of from 1 ppm to 1 weight %, preferably from 10 to 1,000 ppm, more preferably from 50 to 500 ppm, and the organic base is present in a stoichiometric ratio of from 0.5 to 6, preferably 1 to 4, more preferably 2 to 3 mol relative to 1 mol of all monomer component species used as a reactant in the process. The concentration of the catalyst and the organic base may be readily determined by the masses or mass flow rates used of these reagents relative to that of the monomer components.

The process to prepare the cyclic polyester oligomer composition of the invention is not specifically limited, and it may be conducted in a batch, semi-continuous, or continuous manner. Oligomerization processes suitable for preparing the cyclic polyester oligomer composition of the invention can be divided into two groups, solution oligomerization in the presence of a solvent, or oligomerization in the substantial absence of solvent, e.g., melt oligomerization, carried out at a temperature above the melting temperature of the monomer components and oligomeric species.

As the presence of substantial amounts of unreacted monomer component, linear oligomers, or other low molecular weight species, particularly those having acidic or other free OH groups, in the cyclic polyester oligomer composition may detrimentally affect the storage stability and/or polymerization processing behavior of the oligomer composition, the cyclic polyester oligomer composition is subjected to a step in which linear oligomeric polyester species, as well as optionally other impurities, such as low molecular weight (e.g. less than 100 g/mol) species having acidic and/or hydroxyl groups, are removed.

The step in which linear oligomeric polyester species having furanic units, as well as optionally other impurities, are separated and removed from the cyclic polyester oligomer composition of the invention is not specifically limited. Examples of other impurities may be unreacted starting materials such as diacids or diols or residual reagents such as bases or their residues (e.g. amine residues). Separation and purification methods are well-known in the art, for example, as disclosed in Purification of Laboratory Chemicals, Sixth Ed., by W. E. Armarego and C. L. L. Chai, published in 2009 by Elsevier, Oxford (ISBN-13: 978-1856175678), and The Molecular World, Separation, Purification and Identification by L. E. Smart, published in 2002 by the Royal Society of Chemistry, Cambridge (ISBN: 978-1-84755-783-4).

Unless specifically indicated otherwise, conventional separation and purification processes and their various apparatuses, operating parameters and conditions may be used in the processes according to the invention in preparing the cyclic polyester oligomers of structures $Y^1$, $Y^2$, $Y^{1'}$, or $Y^{1''}$ and their compositions.

In one embodiment the separation step in which linear oligomeric species and optionally other impurities are removed comprises one or more separation sub-steps of passing a mobile phase of the cyclic oligomeric composition through a stationary phase, selective precipitation, distillation, extraction, crystallization or their combinations.

In the cyclic polyester oligomer composition product that is obtained after the separation step, linear oligomeric polyester species having furanic units are generally present in an amount of less than 5 wt. %, more in particular in an amount of less than 3 wt. %, still more in particular in an amount of less than 1 wt. % relative to the total weight of the cyclic polyester oligomer composition. The content of linear oligomeric polyester species having furanic units in the cyclic polyester oligomer composition of the invention may be readily determined by conventional methods. For example, the content of linear oligomeric species may be determined by electrospray mass spectrometry, matrix-assisted laser desorption/ionization (MALDI) mass spectrometry, high-performance liquid chromatography (HPLC) method coupled to mass spectronomy, and gel filtration chromatography. In the present application and invention, the concentration of linear oligomeric polyester species having furanic units refers to the concentration as determined by HPLC.

In a preferred embodiment of the composition, the content of residual monomer components, such as $C^1$, $D^1$, $C^2$, or $D^2$, in the cyclic polyester oligomer composition is less than 5, preferably 3, and most preferably 1 weight percent based on the total weight of the composition. The content of such residual monomer (or solvent) components may be determined by FTIR or NMR spectroscopic analysis of the composition. Alternatively the content may be determined by chromatographic methods such as HPLC or GC. In the present application and invention, the concentration of residual monomer (and solvent) components refers to the concentration as determined by HPLC.

The invention relates to a cyclic polyester oligomer composition comprising a cyclic polyester oligomer having furanic units, wherein the structure of the cyclic polyester oligomer having furanic units is $Y^1$ or $Y^2$, and wherein the polyester polymer composition is obtainable with the above-described method. Said cyclic polyester oligomer composition is characterized in that the composition contains: (i) a residual solvent in a concentration of less than 5, preferably 2, more preferably 1 wt %, and selected from the group consisting of an ionic liquid, an optionally-substituted napthalene, optionally-substituted aromatic compound, and their mixtures, (ii) linear oligomeric polyester species having furanic units and present in a concentration of less than 5%, preferably 3, most preferably 1 wt %, and (iii) optionally a zeolite, in a concentration of less than of less than 5, preferably 2, more preferably 1 wt %, wherein the weight percentages are relative to the total weight of the cyclic polyester oligomer composition. Such oligomer compositions can answer most requirements posed by the current polymerization applications.

In another preferred embodiment, the composition comprises a halogenated impurity, preferably an acid chloride and/or its residue. Methods of detection of halogenated impurities in oligomers are well-known and include combustion ion chromatography (IC), optical atomic spectroscopy, and X-ray fluorescence analysis (XRF). However halogenated species may be corrosive and thus require special expensive construction materials for the subsequent polymerization plant. Therefore, their content in the cyclic polyester oligomer composition of the invention will preferably be kept low, e.g. by removal during the subsequent separation and removal step.

In a preferred embodiment of the cyclic polyester oligomer composition, the specific cyclic polyester oligomer having furanic units is one of structure $Y^{1'}$ or $Y^{1''}$, wherein m is an integer from 1 to 20, preferably 2 to 15, most preferably 3 to 10.

Yet another aspect of the present invention is a process to produce a polyester polymer comprising (i) the process of the invention to prepare a cyclic oligomer composition comprising a cyclic polyester oligomer having furanic units together with (ii) a subsequent polymerization step to produce a polyester polymer. Suitable ring opening polymerization catalysts, process conditions, apparatuses and methods are those disclosed in the earlier discussed WO2014/139602, which is hereby incorporated by reference. Related to this aspect is the aspect of the use of the cyclic polyester oligomer composition of the invention in the production of a polyester polymer. Preferred embodiments of this process or use are those in which the polyester polymer is a PEF polymer or a PBF polymer.

Particularly preferred is a polyester polymer composition obtainable, preferably obtained, by the ring opening polymerization process of the invention, wherein the composition contains: (i) a plasticizer selected from the group consisting of an optionally-substituted phenyl ether, an ionic liquid, an optionally-substituted xylene, a polyether, and their mixtures, (ii) a cyclic polyester oligomer having furanic units, and (iii) EITHER: (a) a PEF polymer OR (b) a PBF polymer. The residual plasticizer is preferably present in an amount of less than 10, more preferably 5, even more preferably 2, and most preferably 1 wt %. The content of plasticizer in the polymer may be measured by conventional methods such as that disclosed in Quantifying Polymer Plasticizer Content Through Direct Analysis of Tracer Compounds, IP.com Disclosure Number: IPCOM000246667D, Publication Date: 2016 Jun. 24. The residual unreacted cyclic polyester oligomer having furanic units is preferably present in an amount of less than 5, more preferably 2, even more preferably 1 wt %. In some embodiments, the content of residual plasticizer and unreacted cyclic oligomer is measured by means of their separation from the polymer via solvent extraction, high temperature distillation or column chromatography and then followed by their identification by means of UV, NMR, or IR spectroscopies and/or mass spectrometry. The PEF and PBF polymers will often preferably have molecular weights of at least 10,000, preferably 15,000, more preferably 20,000 Daltons relative to polystyrene standards as measured by SEC.

EXAMPLES

The following examples are set forth to provide those of ordinary skill in the art with a detailed description of how the processes, polyester polymer compositions, and uses claimed herein are evaluated, and they are not intended to limit the scope of what the inventors regard as their invention.

In these examples, the following characterization methods are parameters were used for the characterization of the cyclic polyester oligomer compositions prepared in the examples.
SEC-MALS Conversion and Molecular weight distributions of the polyesters were analyzed using size exclusion chromatography coupled with multi-angle light scattering (SEC-MALS) on an Agilent 1100 GPC using two PFG linear M columns (PSS) connected in series with an Agilent 1100 VWD/UV detector operated at 290 nm, a DAWN HELEOS II multi-angle laser light scattering (MALS) detector (Wyatt Technology Europe) followed by an Agilent 1100 RI detector. Samples were eluted in HFIP with 0.02 M K-TFAc at 1 mL/min at room temperature.
$^1$H NMR Measurements were made on a Bruker AV 300 spectrometer operating at a frequency of 300 MHz and using $CDCl_3$ as solvent.
HPLC-MS An Agilent 1200 Series HPLC with a quaternary pump, autosampler and UV detector was equipped with an Agilent Eclipse XDB-C18, 5 m, 4.6×150 mm column. The eluent mixture was composed of (A) Water stabilized with formic acid (1 mL/L) and (B) Acetonitrile stabilized with formic acid (1 mL/L). A gradient was run at 1 mL/min for 60 min. Solvent ratio of B was changed linearly from 20% to 45.2% during 11 min, then from 45.2% to 80% during 29 min, followed by 10 minutes at 97% and 10 minutes at 20%. Samples were dissolved at 1 mg/mL in HFIP/CHCL3 (15%). Injection volume was 10 □L and UV detection was carried out at 280 nm. Peaks were characterized by online-mass spectroscopy with an Agilent 1640 single-quadrupol MS.
MALDI-TOF The matrix was T-2-[3-(4-t-Butyl-phenyl)-2-methyl-2-propenylidene]malononitrile (DCTB)+Na Mix 10:1, and the instrument type was a Bruker Daltonics Ultraflex II, and the acquisition mode was reflector.

Example 1: A Cyclic Polyester Oligomer Composition (Embodiment of $Y^{1'}$) for Production of PEF In this example, the preparation is described of the cyclic polyester oligomer shown in FIG. 3, which may then subsequently be used to prepare PEF, poly(2,5-ethylene furandicarboxylate). 40 g of me-FDCA were charged together with 20 mL of EG into a glass reactor equipped with a stirrer. The reaction was carried out under inert atmosphere at a starting temperature of 140° C. in the presence of 0.50 g catalyst (Bu2SnO) and progressively heated to a final temperature 180° C. After 1 hour of reaction pressure was reduced to 700 mbar; pressure was reduced again after 40 minutes to 400 mbar and further to 200 mbar after 30 minutes. Finally the pressure was stepwise reduced until 10 mbar. Temperature was increased up to 200° C. and the system was left under this condition for 2 hours. The system was allowed to cool to room temperature and the solid product was removed, ground, and dried. The pre-polymer obtained was characterized with HPLC and GPC, and its identity was confirmed to be $C^{1'}$.

The pre-polymer $C^{1'}$ was dissolved in 2-methylnaphthalene as solvent at a concentration of 10 g/l, and the resulting solution was reacted under inert atmosphere at 200° C. (in the absence of added additional catalyst) for 3 hours in order to transform the pre-polymer $C^{1'}$ into the cyclic oligomer $Y^{1'}$. Next Zeolite Y was added at a concentration of 10 g/l. HPLC analysis confirmed that the concentrations of the cyclic oligomers (m=2 to 5) remained essentially unchanged, but that the linear species (l=1 to 8) were essentially removed from the solution. This result confirms that unreacted linear residual species can be easily removed from the reaction system by adsorption on zeolites.

Comparative Example 1 and 2: Lack of Significant Polymerization of Cyclic Polyester Oligomer Composition ($Y^{1'}$) in the Presence of Low Amount of Plasticizer without Catalyst or without Catalyst or Plasticizer In this example, the cyclic oligomer $Y1'$ (m=2) of Example 1 was reacted for 30 min each at different temperatures between 260° C. and 320° C. with tetra-glyme as plasticizer at a concentration of 60 uL tetra-glyme per 180 mg of cyclic oligomer $Y1'$ and in the absence of added catalyst under inert atmosphere. No reaction occurred and the material remained unchanged.

In a second comparative example, a mixed cyclic oligomer $Y1'$ (m=2 to 7) of Example 1 was reacted at a temperature of 280° C. for 60 min without added plasticizer or catalyst. GPC analysis confirmed that little or no reaction of the m=2 cyclic oligomer occurred. Therefore these comparative examples show that the typically most-abundant species, the low Mw cyclic oligomers (m=2), will generally not significantly polymerize within reasonable times in the absence of catalyst or plasticizer.

Example 2: Production of PEF from Cyclic Polyester Oligomer Composition ($Y^{1'}$): In the Presence of Low Amount of Plasticizer with Catalyst In this example, the cyclic oligomer $Y1'$ (m=2) of Example 1 was reacted as in the Comparative Example 1, but in the presence of cyclic stannoxane as catalyst in a concentration of 0.1 mol % per mol cyclic oligomer repeat units. In this case, a conversion of greater than 95% was achieved within 20 min.

Figure 5:
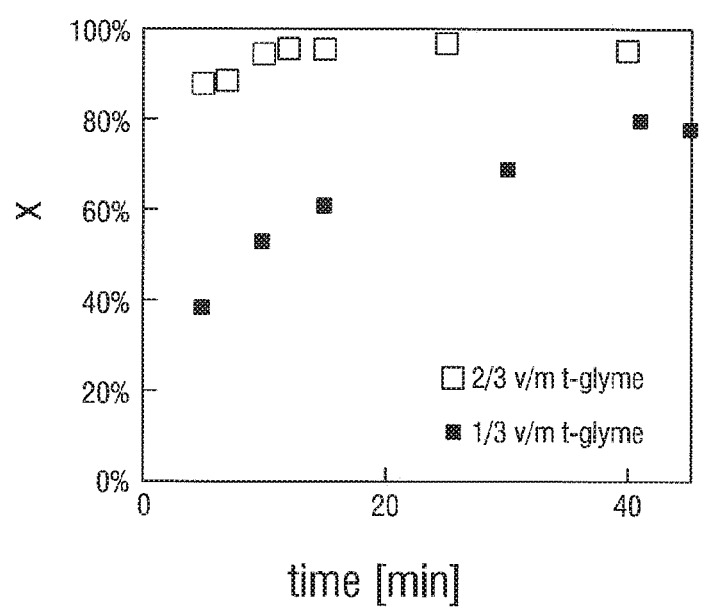
FIG. 5 shows the effect of plasticization on the conversion of the cyclic PEF dimer during ring-opening polymerization.

FIG. 5 shows comparative data for the conversion of the cyclic PEF dimer with both a lower (1/3 v/m) and a higher (2/3 v/m) concentration of the tetra-glyme plasticizer.

In other runs of the polymerization, other metal oxide catalysts such as $Sb_2O_3$ or $Bi_2O_3$ were compared to tin-based catalysts. It was observed that the polymers prepared using the $Sb_2O_3$ or $Bi_2O_3$ were more water-white in appearance than the somewhat yellowish-brown colour obtained with the tin-based catalysts.

Example 3: Production of PEF from Cyclic Polyester Oligomer Composition ($Y^{1'}$): In the Presence of Higher Amount of Plasticizer without Catalyst In this example, the cyclic oligomer $Y1'$ (m=2) of Example 1 was reacted as in the Comparative Example 1, with tetra-glyme as plasticizer at a higher concentration of 240 uL tetra-glyme per 180 mg of cyclic oligomer $Y1'$. In this case, a conversion of greater than 95% was achieved within 60 min at all temperatures.

Example 4: Influence of Reaction Conditions on the Production of PEF from Cyclic Polyester Oligomer Compositions by Ring-Opening Polymerization In this example, high molecular weight PEF polymers were prepared from cyclic PEF oligomers (cyOEF), which had been prepared as described earlier in the description of this application as well as in WO2014/139603 (A1).

The following sub-sections outline the chemicals, equipment and analytical devices used to demonstrate by example the influence of various reaction conditions on the synthesis of PEF polymers from cyclic PEF oligomers (cyOEF).

Materials

Dibutyltin oxide ($Bu_2SnO$, ≥98%), anhydrous ethylene glycol (EG, 99.8%), Dimethyl 2,5-furandicarboxylate (meFDCA, 99%), 2-ethylhexanoic acid tin(II) (tin octoate, $SnOct_2$, 95%), 1-dodecanol (98%), trifluoroacetic acid (TFA, 99%) and potassium trifluoroacetate (K-TFAc, 98%), 2-Methylnaphthalene (95% or 97%), acetonitrile (ACN, ≥99.7%), n-hexane (≥95%), toluene (≥99.7%), tetraethylene glycol dimethyl ether (tetraglyme, 99%), diethyl ether (Et2O, ≥99.8%), dichloromethane (DCM, 99.99%), hexafluoroisopropanol (HFIP, 99.9%), chloroform-d (CDCl3, ≥99.8%) and trifluoroacetic acid-d (TFA-d, 99.5%) were used as received from commercial laboratory supply houses. The initiators, 1-dodecanol and tetraglyme were stored in a glove box under nitrogen atmosphere. It is noted that these same materials were generally used in the previous examples as well.

For benchmarking the produced PEF examples versus bottle-grade PET, samples of the latter were taken from commercially available PET plastic bottles. To confirm the accuracy of the polymer molecular weight analysis, PET and PMMA standards were analyzed from PSS Polymer Standards Service, Germany.

Analytics

1H NMR (300 MHz, 400 MHz) spectra were recorded on Bruker Avance III spectrometers. 1H NMR spectra were referenced against the residual solvent signal. Conversion (X), number- and weight-average absolute molecular weights, Mn and Mw values of PET and PEF samples were determined by size exclusion chromatography (SEC). An Agilent 1100 GPC/SEC unit was used equipped with two PFG linear M columns (PSS) connected in series with an Agilent 1100 VWD/UV detector operated at 290 nm, a DAWN HELEOS II multi-angle laser light scattering (MALS) detector (Wyatt Technology Europe) followed by an Optilab T-rEX RI detector from Wyatt. Samples were eluted in HFIP with 0.02 M K-TFAc at 1 mL/min at room temperature. Conversion was evaluated with PSS WinGPC Unichrom software as the fraction of PEF versus total UV signal area. Absolute molecular weights were evaluated with Wyatt ASTRA software and dn/dc values based on our analytical setup (dn/dc (PEF)=0.227 mL/g, dn/dc (PET)

=0.249 mL/g). Further absolute molecular weights were obtained from diffusion (DOSY) NMR measurements using 0.4 mg/mL samples of PET and PEF in TFA-d.

Analysis of cyOEF ring-size composition and the purity from residual linears was assessed on an Agilent 1100 HPLC with UV detector at 280 nm followed by an Agilent 1640 single quadrupole ESI-TOF mass spectrometer. Linear and cyclic species were unambiguously identified via this HPLC-MS setup and cyOEF purity was evaluated as the HPLC area associated with the peaks of the cyclic oligomers versus the overall HPLC area. UV absorptivity of linear and cyclic species was assessed prior to these measurements to ensure unbiased evaluation, and was found equal for all species. Samples were dissolved in 15% (v/v) HFIP/CHCl3 and eluted over an Eclipse XD8-C18 column (150×4.6 mm, 3.5 μm pore size) with an Acetonitrile/H2O gradient from 20/80 to 80/20 over 40 min at 1 mL/min. Formic acid 0.1% (v/v) was added as stabilizer to both the organic and aqueous phases, using Millipore water as the aqueous phase and acetonitrile as the organic phase. The injection volume was kept constant at 10 μL.

Thermal properties analysis was performed on a Mettler Toledo DSC Polymer machine calibrated with indium and zinc standards. The heating rate was 10° C./min under nitrogen flow. Cyclic oligomer melting points were derived from the first heating curve, glass transition temperature (Tg) and the melting point (Tm) of PEF were derived from the second heating curve after quenching in liquid nitrogen. Tg was recorded at the midpoint temperature. Thermal stability and degradation were analyzed on a Mettler Toledo TGA/SDTA 851 using a heating rate of 10° C./min under nitrogen flow.

Polarized optical microscopy (POM) images were acquired with an Olympus BX51 microscope equipped with a Linkam LTS350 temperature controlled stage and a DP72 digital camera. Powder diffraction patterns were recorded on a Stoe&Cie STADI P Powder diffractometer with Cu—K alpha1 radiation, focusing Ge-Monochromator and Dectris Mythen Silicon Strip Detector. ICP-OES analysis was performed on a Perkin Elmer Optima 8300. Gas permeability analysis of ROP-based PEF and PET films was performed at 23° C. and 50% relative humidity on a MOCON Ox-Tran device using films of 35-45 μm thickness as obtained from solution casting. Film preparation was done by casting of about 200 mg/mL PEF solutions in HFIP over a glass plate heated at 70° C. to evaporate HFIP, and film thickness was measured afterwards.

Preparation of Cyclic Stannoxane (cySTOX) Initiator and Preparation of Cyclic Oligoethylene Furanoate (cyOEF) Via Depolymerization 1,1,6,6-tetra-n-butyl-1,6-distanna-2,5,7,10-tetraoxacyclodecane, or commonly named cyclic stannoxane (cySTOX) was synthesized using literature methods.

The cyclic PEF oligomers (cyOEF) were prepared following the methods described earlier in this application and in as well as in WO2014/139603 (A1). For the route via depolymerization in particular, 400 g dimethyl 2,5-furandicarboxylate (400 g, 2.17 mol, 1. eq), ethylene glycol (270 g, 4.35 mol, 2 eq.) and Bu2SnO (2 g, 8 mmol, 0.004 eq.) were charged in a three-neck round bottom flask equipped with a magnetic stirrer under N2 atmosphere. The solution was stirred at 200° C. and methanol as condensation product was distilled and removed over the course of 2 h. Excess ethylene glycol was removed overnight under vacuum to obtain a solid product. This PEF prepolymer (linOEF) was stored in the glove box, and batches of 10 g linOEF prepolymer were dissolved in 1 L of 2-methylnaphthalene (2-MN) at 200° C. in the three-neck round bottom flask equipped with a magnetic stirrer under N2 atmosphere. The solution was stirred for 6 h at which the conversion of linOEF to cyOEF equilibrated around 80%. The cyOEF/linOEF products were collected via precipitation via cooling and sometimes addition of 1:1 v/v hexane, followed by filtration.

cyOEF were purified from linear species by elution in DCM with up to 7.5% v/v Et2O over short silica gel columns. The product was concentrated, yielding the cycles as a white powder at purities up to >99%. Individual cyclic species could also be fractionated by eluting crude product in DCM over silica gel using Et2O/DCM (7.5/92.5 v/v) as mobile phase. All purification products were collected and their purity was analyzed by HPLC-MS, and they were characterized by 1H NMR.

Synthesis of Polyethylene Furanoate (PEF) Via ROP

For every batch of Ring-Opening Polymerization (ROP) in melt, a quantity of cyOEF was weighed into a Schlenk tube reactor equipped with a magnetic stirrer in the glove box. The tube was transferred to a heating block and dried under vacuum. The reactor was removed from the heater and the vacuum was released with nitrogen. The temperature was set to the desired value, and the Schlenk tube was reintroduced to the heating block. Initiator was added neat or in form of a suspension with the plasticizer (tetraglyme). Initiator suspensions were preheated to 70° C. under stirring, as especially for cySTOX—which unlike $SnOct_2$ is a powder at room temperature—an increased solubility and thus increased homogeneity of the initiator solution at higher temperatures were observed. Initiator was injected at concentrations of 0.01 to 0.03 M in tetraglyme, after 5 min of temperature equilibration in the case of cyclic dimer, or before heating to reaction temperature. Samples were taken over the course of the reaction. Visual appearance and discoloration were qualitatively analyzed during sampling. After the desired reaction time, the product was quenched by immersion in ice water followed by dissolution in pure HFIP and precipitation in THF. The product was collected either by filtration or by centrifuging the mixture and decanting off the solvent. The solid was dried under vacuum at 80° C., yielding a white or brown powder depending on the reaction conditions, as discussed later, which was characterized by 1H NMR.

Figure 11:
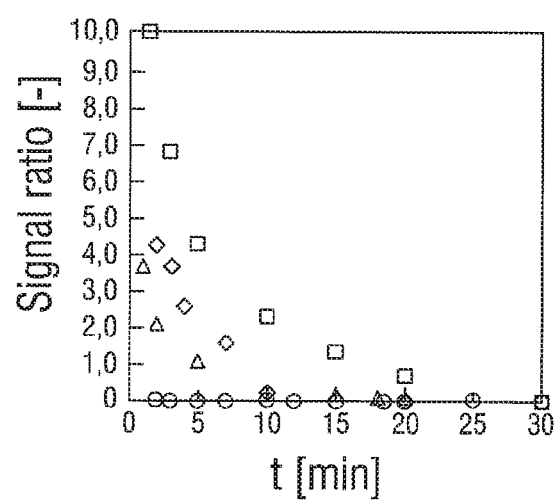
FIG. 11 shows how tetraglyme (plasticizer) leaves the reaction mixture by evaporation due to operation of ROP close to its boiling point

The results of these additional examples illustrating the influence of reaction parameters on the production of the initial cyclic PEF oligomers (cyOEF) and subsequently the representative final PEF polymer are shown in FIG. 11.

Figure 6:
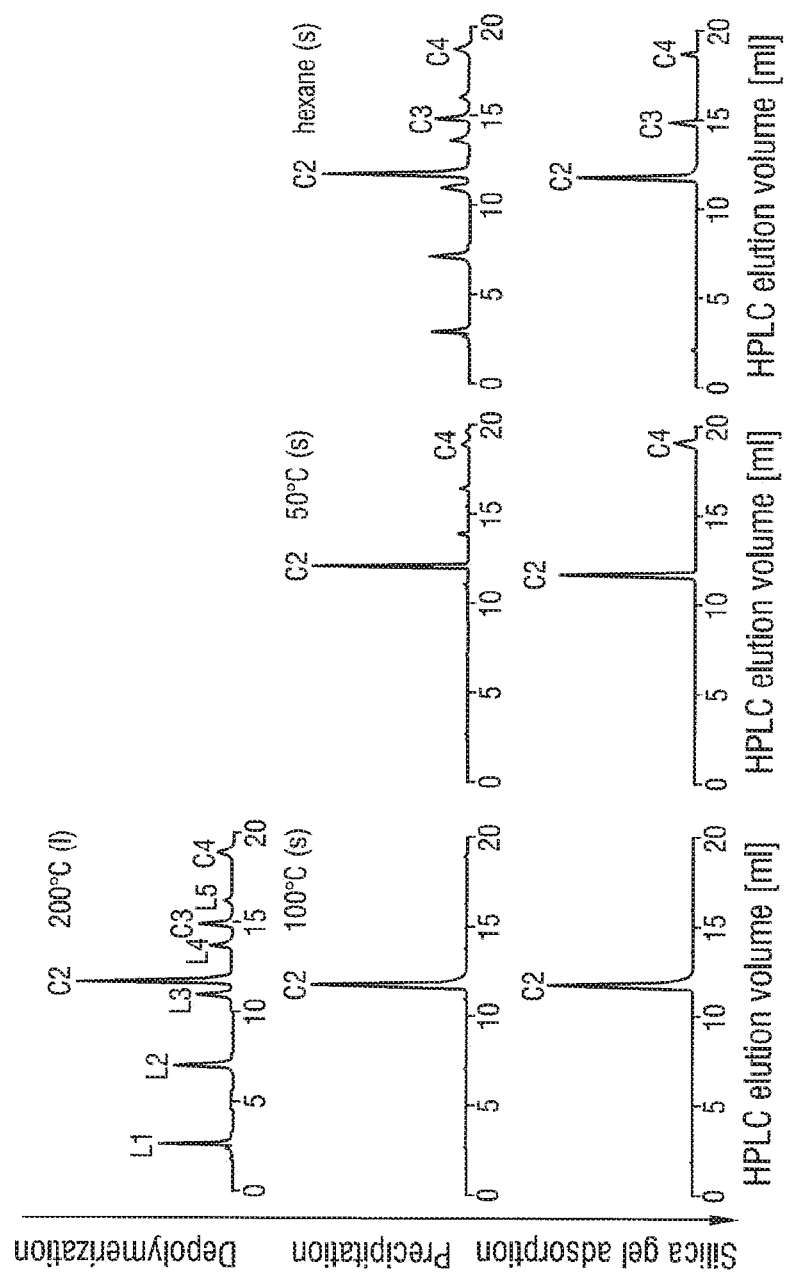
FIG. 6 shows the HPLC results for recovery procedures of cyclic PEF polyester oligomer

FIG. 6 illustrates aspects of the recovery procedure after cyOEF preparation. Upon cooling to 100° C., cyclic dimer C2 precipitates first. Further cooling precipitates more cyclics but not the trimer C3, and linear chains (linOEF). An antisolvent may be used to precipitate out C3 as well. Such selective precipitation methods allow the preparation of cyOEF materials of different composition. Purification via silica gel allows for the removal of residual linOEF, which would limit the ultimately achievable molecular weight during the subsequent ROP.

Figure 7:
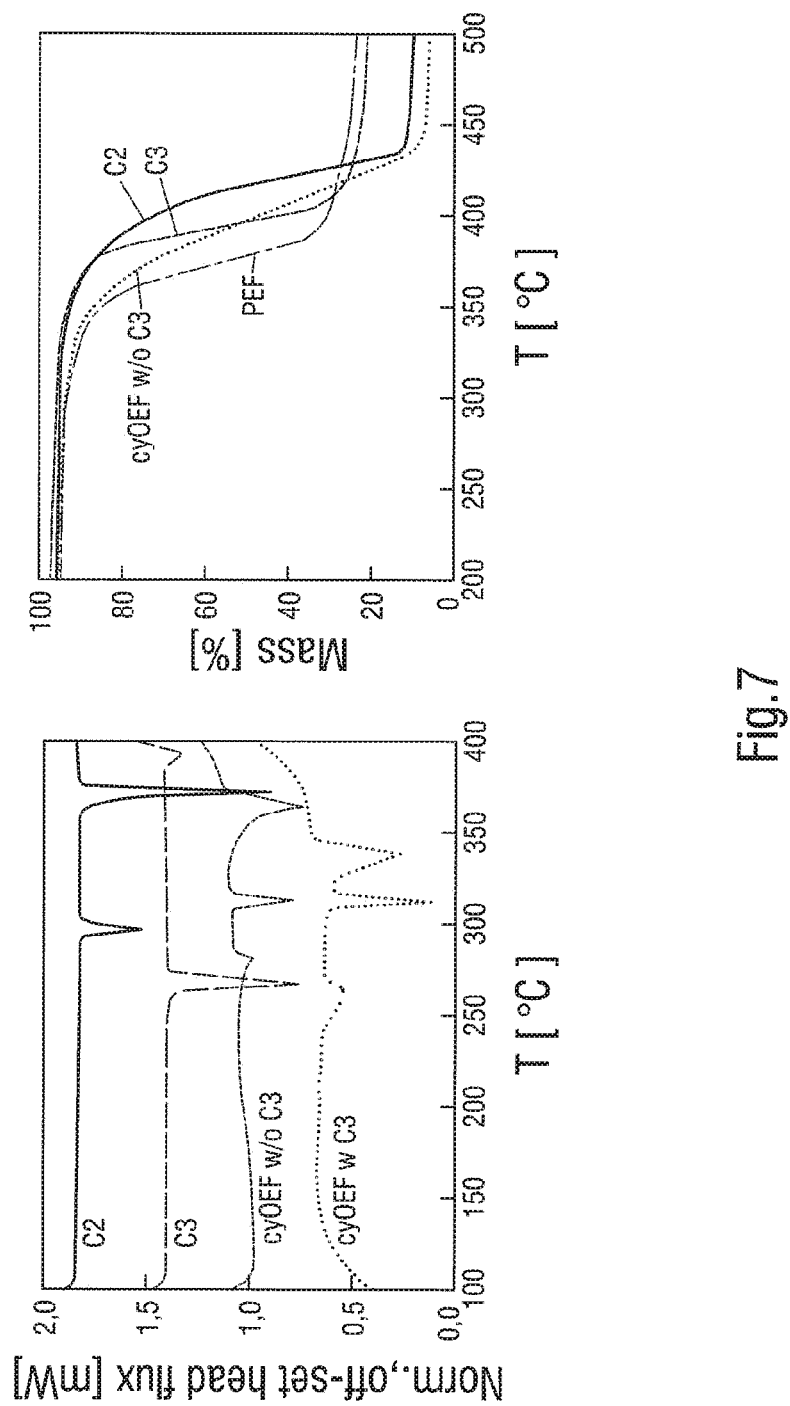
FIG. 7 shows the thermal analysis results by DSC (left) and TGA (right) of cyclic PEF polyester oligomer species and compositions

FIG. 7 shows DSC (left) and TGA (right) traces of isolated cyclic dimer C2, C3, cyOEF where the C3 has been removed due to precipitation upon cooling, cyOEF with a full spectrum of ring sizes after hexane precipitation, and PEF polymer. These plots demonstrate that the C2 dimer, which is the major component in cyOEF usually derived from cyOEF synthesis such as depolymerization, has two thermal transitions. The first one at 290° C. is a recrystallization as evidenced by powder diffraction and POM analysis, and the second one at 370° C. is the actual melting point. The melting points of cyOEF species and mixtures of different composition and PEF polymer evaluated by DSC are summarized in the table shown in FIG. 8, and the literature values for cyclic PET oligomers of a given ring size and the linear PET polymer are provided for comparison as well.

The very high melting point of the C2 cyOEF dimer is in the thermal range of both the PEF polymer and cyOEF degradation (see TGA on the right of the figure). Therefore the ROP of PEF cyclic oligomers is required to be carried out well below this temperature in order to obtain a satisfactory polymer product having good color. This optimized result can be achieved with plasticization, as shown in the following sub-examples.

Figure 9:
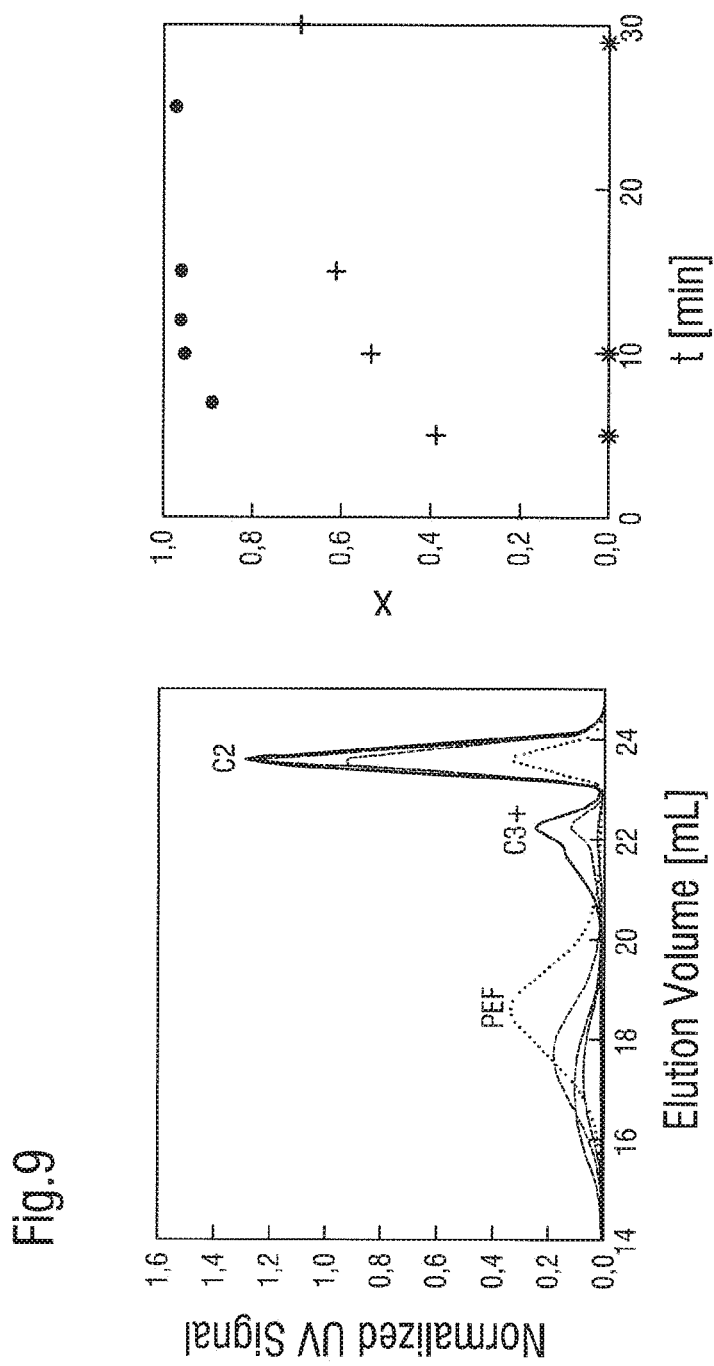
FIG. 9 shows SEC traces of purified cyclic PEF polyester oligomer held at 280 C (left) and conversion plots for cyclic PEF dimer held with and without additives (right)

FIG. 9 shows SEC traces of purified cyOEF (–), held neat at 280° C. without additives after 20, 60, 240 and 666 min, represented by the dashed lines of increasing punctuation, respectively. The corresponding molecular weights of the formed polymer (PEF peak) during the reaction were Mn=33.8, 40.5, 24.8 and 13.8 kg/mol, respectively. These results illustrate that C3 and higher order cycles react to PEF within 1 h, while complete C2 conversion requires more than 10 h, by which degradation as substantially lowered the achieved PEF molecular weight.

Figure 10:
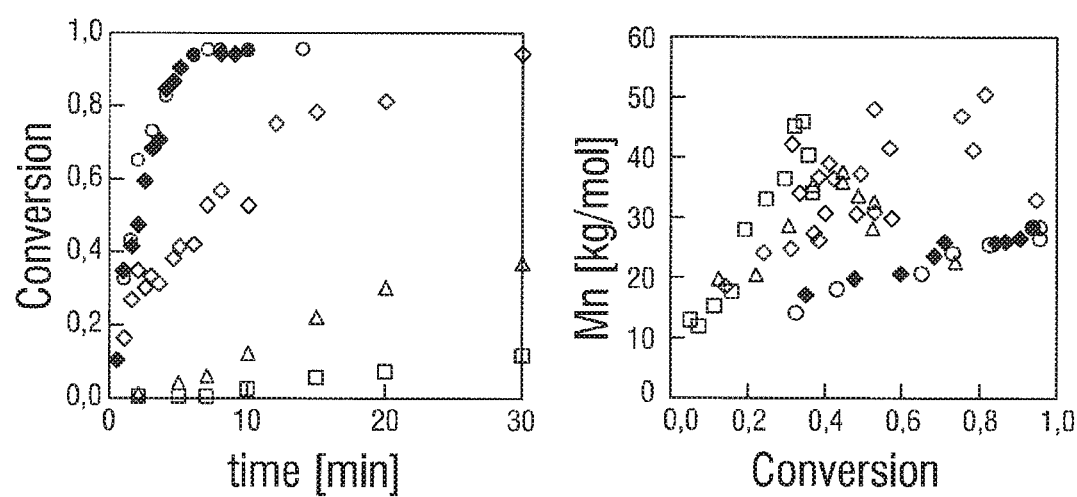
FIG. 10 shows conversion and molecular weight evolutions for PEF ROP at different reaction conditions (plasticizer content 50%)

FIG. 10. Illustrates the effects of the plasticization (Right). The conversion of purified cyOEF held neat at 280° C. without additives (Q), is compared with ROP using 66% (Δ) tetraglyme without initiator, grinding 0.1% cySTOX initiator without plasticizer into cyOEF (◇), the same grinding with added 33% tetraglyme (♦) and pre-mixing of initiator with tetraglyme as plasticizer by stirring without grinding (○). These results show that homogenization by grinding (as in an extruder at industrial scales) an initiator into the cyOEF raw material increases reaction speed substantially, leading to high molecular weights, however, in a very heterogeneous way and reaction time long enough to allow for discoloration. The best results in terms of conversion and discoloration are achieved by using tetraglyme as plasticizer and facilitator of a homogeneous distribution of the initiator.

FIG. 11 shows how tetraglyme at different plasticizer loadings from 0% (○), 25% (Δ), 33% (◇), to 100% (□) is leaving the reaction mixture along the reaction by evaporation due to operation of ROP close to its boiling point (275 C).

Figure 12:
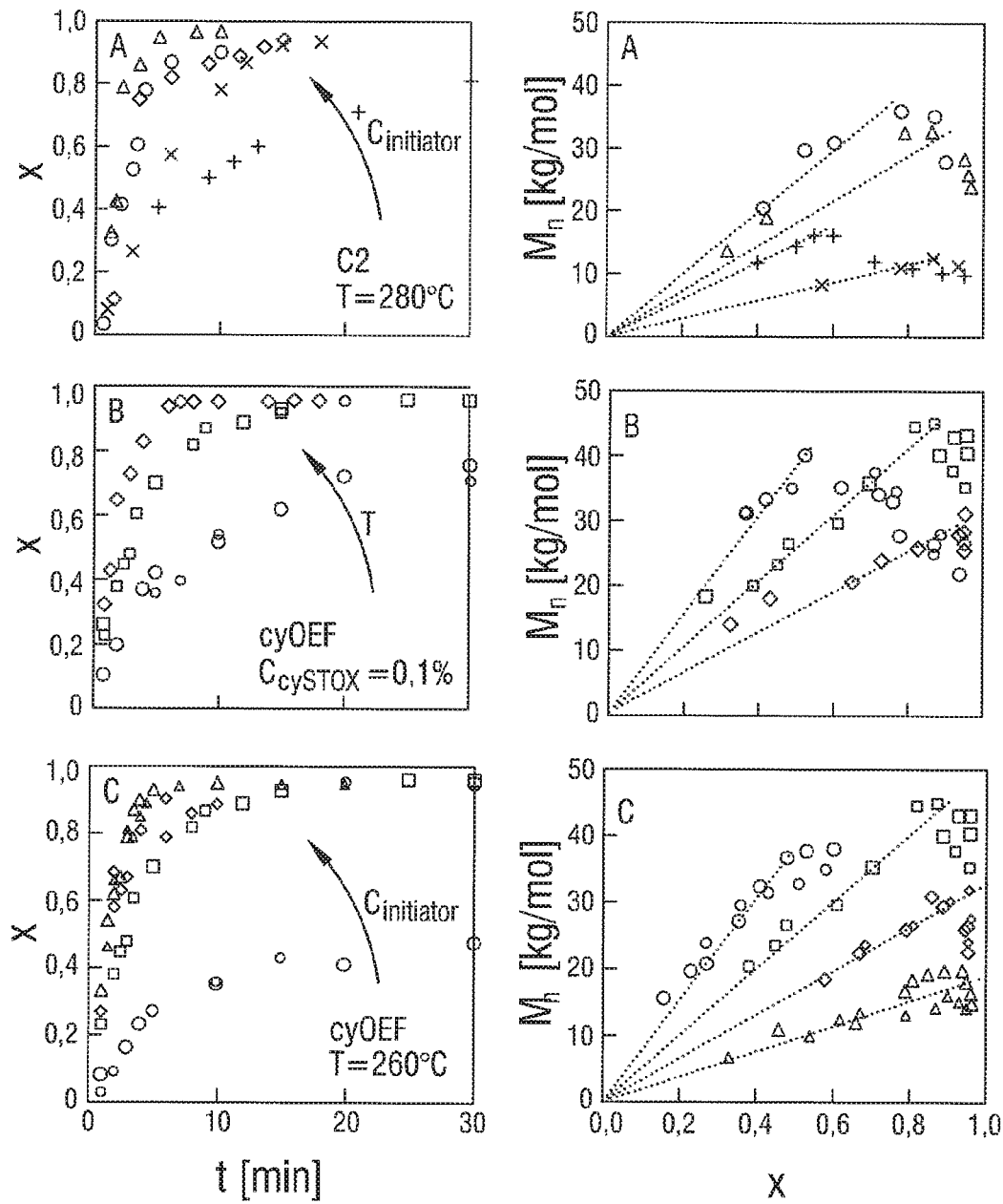
FIG. 12 illustrates the conversion and molecular weight evolutions for the ROP to produce PEF under different reaction conditions

FIG. 12 illustrates the conversion and molecular weight evolutions for PEF ROP under different reaction conditions. Plasticizer content was 50% in all cases. Sub-plots A demonstrates the feasibility of full (95%) conversion of the cyOEF C2 species, the most resistant and highest melting cyclic species, to PEF via ROP. Reaction conditions were a temperature of 280° C. using 0.1% (+) and 0.2% (×) SnOct2, and 0.07% (○) and 0.15% (Δ) cySTOX as initiators. Sub-plots B shows the influence of reaction temperature, using purified cyOEF composed of mostly C2 and C4, with less C3, C5, C6, C7. Reaction conditions were 0.1% cySTOX as initiator at reaction temperatures of 240° C. (○), 260° C. (□), and 280° C. (◇). Sub-plots C show the optimization of initiator content for ROP. Reaction conditions were a temperature of 260° C. using different cySTOX loadings, namely 0.05% (○), 0.1% (□), 0.2% (◇), and 0.3% (Δ). The dashed lines in FIG. 13 are to guide the eye towards the partial living behavior (linear trend of Mn with X), before degradation becomes dominant. 0.1% cySTOX as initiator at 260° C. presented the optimal conditions in these examples, reaching the highest molecular weight in less than 20 min, before molecular weight degradation becomes dominant.

FIG. 13 shows selected results of ROP for the synthesis of PEF using a plasticizer amount of 50% mass per mass cyOEF. Purity of the cyclic oligomer is given as the HPLC area fraction of cyOEF relative to the total area. X is the conversion as quantified as the SEC area fraction of PEF vs the total area. Mn and Mw are absolute molecular weights from SEC-MALS.

Table entries 1 and 2 show that purified cyOEF often may react very slowly and sometimes take more than 10 h to reach 80% conversion. Full conversion with bottle-grade molecular weight are thus generally not readily feasible without the addition of initiator and plasticizer.

Table entries 3-7 show the feasibility of converting C2, the highest melting and most reaction-resistant cyclic species, to PEF. Two initiators were used, namely $SnOct_2$ and cyclic stannoxane (cySTOX). $SnOct_2$ often may only allow for the production of lower molecular weight PEF polymers due to the required alcohol to activate $SnOc_2$, which gives additional end-groups to the systems and thus lowers the achievable molecular weight. cySTOX was thus the preferred initiator in these examples in terms of achievable molecular weight and reaction rates.

Table entries 8-10 show the effect of cyOEF purity. Lower purities allow only for lower molecular weight polymers to be produced. Without wishing to be bound to any mechanism, the inventors conclude that a purity of about 98-99% is needed to achieve a high polymer molecular weight.

Table entries 11-12 show the effect of temperature using the cySTOX initiator. Going from 280° C. to 260° C. slowed the reaction rate but enabled a higher molecular weight to be produced due to limited thermal degradation. The temperature of 240° C. was too low in these specific examples and slowed the reaction so much that the long reaction time exposed the product too long to the underlying degradation.

Table entries 13-15 showed the optimization of initiator content after the reaction temperature had been optimized to 260° C. for the specific reaction conditions in this particular example and the reaction equipment used. A higher initiator content meant a faster reaction and lower molecular weight, due to an increased number of end-groups and chains in the system. The optimum concentration in these specific examples was found to be about 0.1 mol % (relative to cyOEF repeats) cySTOX.

Table entries 16-19 show data of selected ROP reactions to evaluate the influence of various parameters on polymer discoloration. Polymerizations 16 and 17 were conducted using less pure (95%) cyOEF at high and low temperatures for the same reaction time, whereas the high temperature resulted in a strong visual discoloration of the PEF polymer product, and the low T shows no coloring but also insufficient conversion, outlining the effect of temperature (only qualitative result here). Polymerizations 18 and 19 show the effect of purity on the reactions. The same conditions were applied to batches of different cyOEF purity (97% vs 99%), where a brown polymer product of lower molecular weight and a much less discolored and higher molecular weight PEF product were obtained, respectively.

Table entries 20-24 show preliminary results using different non-tin initiators with non-optimized conditions, demonstrating the feasibility of using them for ROP for PEF as well. $Sb_2O_3$ is antimony (III) oxide, $Bi_2O_3$ is Bismuth (III) oxide, FeAc is iron acetate, $Ca(MeO)_2$ is calcium methoxide.

It should be noted that the results and their conclusions in this example hold for the specific reaction compositions evaluated under the specific reaction conditions carried out in the specific reactor system of the example but that other reaction compositions, conditions and reactor systems may yield somewhat different results.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A process to prepare a polyester polymer comprising:
performing a ring-opening polymerization of a cyclic oligomer composition comprising a cyclic polyester oligomer having furanic units,
wherein the ring-opening polymerization is carried out in the presence of a plasticizer, the plasticizer being a compound which is capable of decreasing at least one of a melting point and a viscosity of the cyclic polyester oligomer having furanic units,
wherein a content of the plasticizer is 5 mass % to 60 mass % based on a mass of the cyclic oligomer composition, and
wherein the plasticizer is at least one selected from the group consisting of: a supercritical fluid, an optionally-substituted phenyl ether, an ionic liquid, an optionally-substituted xylene, a polyether, and mixtures thereof.

2. The process of claim 1, wherein the plasticizer is at least one selected from the group consisting of: an optionally-substituted phenyl ether, an ionic liquid, an optionally-substituted xylene, and mixtures thereof.

3. The process of claim 1, wherein the supercritical fluid is carbon dioxide or the polyether is a glyme.

4. The process of claim 1, wherein the ring-opening polymerization step is carried out in the presence of a catalyst.

5. The process of claim 4, wherein the catalyst is selected from the group consisting of: $Sb_2O_3$, $SnOct_2$, and a cyclic dibutylin compound.

6. A polyester polymer composition containing a polyester polymer obtainable by the process of claim 1, wherein the polyester polymer composition contains:
a plasticizer selected from the group consisting of an optionally-substituted phenyl ether, an ionic liquid, an optionally-substituted xylene, a polyether, and mixtures thereof;
a cyclic polyester oligomer having furanic units; and
either:
(a) a PEF polymer comprising the structure

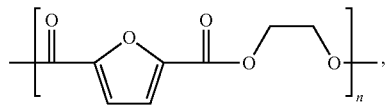

or
(b) a PBF polymer comprising the structure

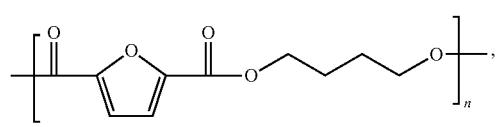

wherein n is an integer from 10 to 100,000.

7. The polyester polymer composition of claim 6, wherein n is an integer from 100 to 10,000.

8. The process of claim 1, wherein the cyclic polyester oligomer composition comprising a cyclic polyester oligomer having furanic units has been prepared in a process comprising:
a reaction step of either:
reacting a monomer component $C^1$ or $D^1$ in the presence of an optional catalyst or an optional organic base in a ring closing oligomerization step under conditions of a reaction temperature and reaction time sufficient to yield a cyclic polyester oligomer having furanic units and of structure $Y^1$, wherein the monomer component $C^1$ comprises the structure

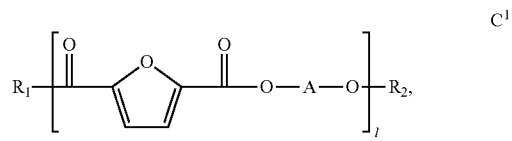

wherein each of the groups A is an optionally-substituted linear, branched or cyclic alkyl, phenyl, aryl, or alkylaryl, and wherein l is an integer from 1 to 100,
wherein
$R_1$=OH, OR, halogen, or O-A-OH,
R=optionally substituted linear, branched or cyclic alkyl, phenyl, aryl or alkylaryl,
$R_2$=H or

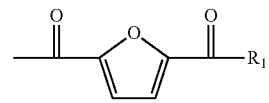

wherein the monomer component $D^1$ comprises a mixture of the compounds shown below:

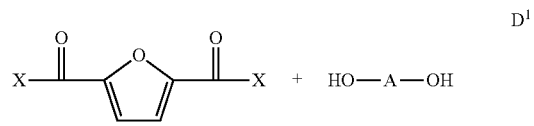

and wherein A is an optionally-substituted linear, branched or cyclic alkyl, phenyl, aryl, or alkylaryl, and wherein each of the groups X is an OH, a halogen, or an optionally-substituted alkyloxy, phenoxy, or aryloxy, and wherein the groups X are not OH when A is n-butyl, and wherein the structure $Y^1$ of the cyclic polyester oligomer having furanic units is

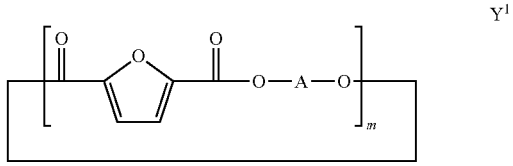

wherein m is an integer from 1 to 20; or reacting a monomer component $C^2$ or $D^2$ in the presence of an optional catalyst or optional organic base in a ring closing oligomerization step under conditions of a reaction temperature and reaction time sufficient to yield a cyclic polyester oligomer having furanic units and of structure $Y^2$, wherein the monomer component $C^2$ comprises the structure

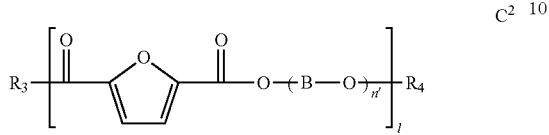

wherein each of the groups B is an optionally-substituted linear, branched or cyclic alkyl, phenyl, aryl, or alkylaryl, wherein l is an integer from 1 to 100, wherein n' is an integer from 1 to 20, and wherein
$R_3$=OH, OR, halogen, or O—(B—O)$_{n'}$—H,
R=optionally substituted linear, branched or cyclic alkyl, phenyl, aryl or alkylaryl,
$R_4$=H or

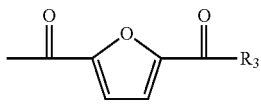

the monomer component $D^2$ comprises a mixture of the compounds shown below:

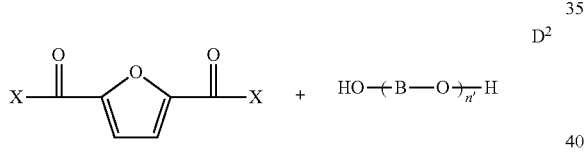

and wherein each of the groups X is an OH, a halogen, or an optionally-substituted alkyloxy, phenoxy, or aryloxy, each of the groups B is an optionally-substituted linear, branched or cyclic alkyl, phenyl, aryl, or alkylaryl, and n' is an integer from 1 to 20,
and wherein the structure $Y^2$ of the cyclic polyester oligomer having furanic units is

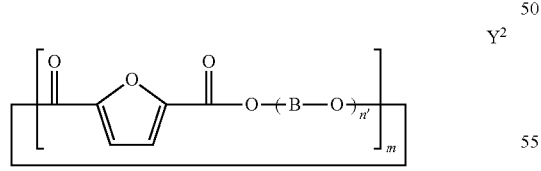

wherein each of the groups B is an optionally-substituted linear, branched or cyclic alkyl, phenyl, aryl, or alkylaryl, n' is an integer from 1 to 20, and m is an integer from 1 to 20; and
a separation step in which linear oligomeric polyester species having furanic units are separated and removed from the cyclic oligomeric composition, wherein:
the reacting of the monomer component C1 or D1 or $C^2$ or $D^2$ in the presence of an optional catalyst or optional organic base in the ring closing oligomerization step is carried out in the presence of a solvent selected from the group consisting of: an ionic liquid, an optionally-substituted napthalene, an optionally-substituted aromatic compound, and mixtures thereof, and the reacting of the monomer component C1 or D1 or $C^2$ or $D^2$ in the presence of an optional catalyst or optional organic base in a ring closing oligomerization step is optionally carried out in the presence of a zeolite, wherein impurities are absorbed onto the zeolite,
and the separation step in which linear oligomeric polyester species having furanic units are separated and removed from the cyclic oligomeric composition comprises one or more of the following sub-steps:
adding a zeolite and absorbing impurities onto the zeolite,
cooling the cyclic oligomeric composition in order to precipitate out cyclic polyester oligomers having furanic units,
adding an antisolvent in order to precipitate out cyclic polyester oligomers having furanic units, and
separating zeolites having absorbed impurities from the cyclic oligomeric composition.

9. The process of claim 8, wherein either:
the monomer component is $C^1$ and A is an optionally-substituted linear, branched or cyclic alkyl, l is an integer from 3 to 25, and m is an integer from 3 to 10,
the monomer component is $D^1$ and A is an optionally-substituted linear, branched or cyclic alkyl, X is a halogen, or optionally-substituted alkyloxy or phenoxy, and m is an integer from 3 to 10, and wherein the structure of the cyclic polyester oligomer having furanic units is one of $Y^1$,
the monomer component is $C^2$ and B is an optionally-substituted linear, branched or cyclic alkyl, l is an integer from 3 to 25, m is an integer from 3 to 10, and n' is an integer from 2 to 10,
or
the monomer component is $D^2$, and X is an OH, a halogen, or optionally-substituted alkyloxy, phenoxy, or aryloxy, B is an optionally-substituted linear, branched or cyclic alkyl, or phenyl, n' is an integer from 2 to 10, and m is an integer from 3 to 10, and wherein the structure of the cyclic polyester oligomer having furanic units is one of $Y^2$.

10. The process of claim 8, wherein either
the monomer component is $C^1$ and A is an optionally-substituted linear, branched or cyclic $C_1$ to $C_6$ alkyl, and l is an integer from 3 to 25, and m is an integer from 3 to 10,
the monomer component is $D^1$ and A is an optionally-substituted linear, branched or cyclic $C_1$ to $C_6$ alkyl, X is a halogen, or optionally-substituted alkyloxy or phenoxy, and m is an integer from 3 to 10,
the monomer component is $C^2$ and wherein B is an optionally-substituted linear, branched or cyclic $C_1$ to $C_6$ alkyl, l is an integer from 3 to 25, m is an integer from 3 to 10, and n' is an integer from 2 to 10, or
the monomer component is $D^2$, X is a halogen, or an optionally-substituted alkyloxy, phenoxy, or aryloxy, B is an optionally-substituted linear, branched or cyclic $C_1$ to $C_6$ alkyl, or phenyl, n' is an integer from 2 to 10, and m is an integer from 3 to 10.

11. The process of claim 8, wherein either:
the monomer component is $C^1$ or $C^2$ and the reaction temperature is from 100 to 350, ° C., and the reaction time is from 30 to 600 minutes, or the monomer component is $D^1$ or $D^2$ and the reaction temperature is from −10 to 150° C., and the reaction time is from 5 to 240 minutes.

12. The process of claim 11, wherein the monomer component is $C^1$ or $C^2$ and the reaction temperature is from 100 to 350° C., and the reaction time is from 50 to 300 minutes, or the monomer component is $D^1$ or $D^2$ and the reaction temperature is from 0 to 80° C., and the reaction time is from 15 to 120 minutes.

13. The process of claim 8, wherein either the monomer component $C^1$ comprises the specific structure

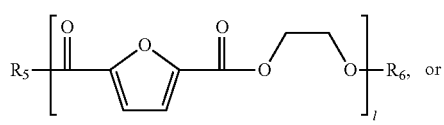

the monomer component $D^1$ comprises a mixture $D^{1'}$ of the compounds shown below:

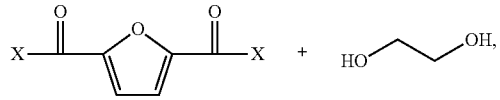

and the structure $Y^1$ of the cyclic polyester oligomer having furanic units is the specific structure

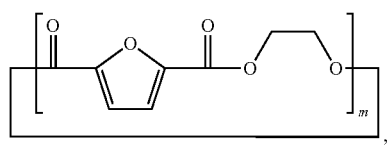

wherein $R_5$=OH, OR, halogen, or O—CH$_2$CH$_2$-OH,

R=optionally substituted linear, branched or cyclic alkyl, phenyl, aryl or alkylaryl, $R_6$=H or

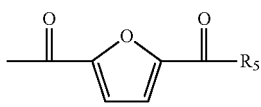

and X is a halogen, or an optionally-substituted alkyloxy, phenoxy, or aryloxy, l is an integer from 1 to 100, and m is an integer from 1 to 20.

14. The process of claim 8, wherein either the monomer component $C^1$ comprises the specific structure $C^{1''}$

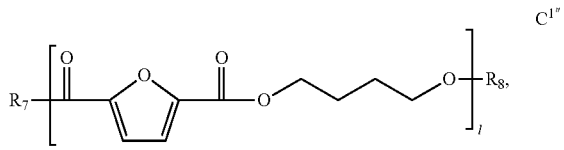

or the monomer component $D^1$ comprises a mixture $D^{1''}$ of the compounds shown below:

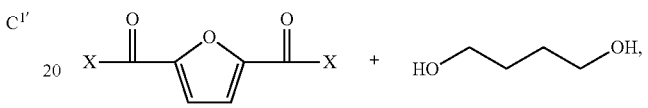

and the structure $Y^1$ of the cyclic polyester oligomer having furanic units is the specific structure $Y^{1''}$

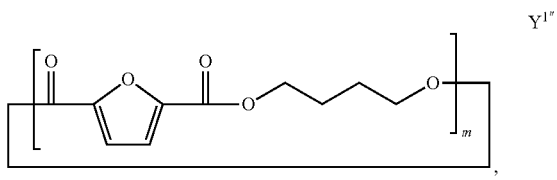

$R_7$=OH, OR, halogen, or O—CH$_2$CH$_2$CH$_2$CH$_2$—OH,

R=optionally substituted linear, branched or cyclic alkyl, phenyl, aryl or alkylaryl, $R_8$=H or

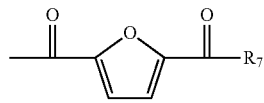

and X is a halogen, or an optionally-substituted alkyloxy, phenoxy, or aryloxy, 1 is an integer from 1 to 100, l is an integer from 1 to 100, and m is an integer from 1 to 20.

15. The process of claim 8, wherein the optional organic base is present and is a monoamine compound or a compound having the structure:

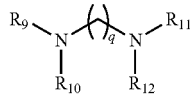

wherein each of the groups $R_9$ to $R_{12}$ are hydrogen, optionally-substituted alkyl, phenyl, aryl, or alkaryl, and wherein each of the groups $R_9$ to $R_{12}$ may optionally be bonded together by a single or double bond group as part of a cyclic substituent in a cyclic optional organic base.

16. The process of claim 8, wherein the optional organic base is present and is either:

(1,4-diazabicyclo[2,2,2]octane), having the structure:

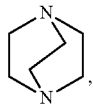

or (1,8-diazabicyclo[5,4,0]undec-7-ene), having the structure:

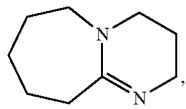

and wherein (1,4-diazabicyclo[2,2,2]octane) or (1,8-diazabicyclo[5,4,0]undec-7-ene) is optionally used together with an alkyl amine.

17. The process of claim 16, wherein the alkyl amine is triethylamine.

18. The process of claim 8, wherein the optional catalyst is either absent or it is present and is a metal alkoxide or metal carboxylate, wherein the metal is selected from the group consisting of: tin, zinc, titanium, and aluminium, or wherein the optional organic base is present in a stoichiometric ratio of from 0.5 to 6 mol relative to 1 mol of all monomer component species used as a reactant in the process.

19. The process of claim 8, wherein the separation step in which linear oligomeric polyester species having furanic units are separated and removed from the cyclic oligomeric composition comprises one or more additional separation sub-steps of: passing a mobile phase of the cyclic oligomeric composition through a stationary phase, selective precipitation, distillation, extraction, crystallization or combinations thereof.

20. The process of claim 8, wherein l is an integer from 2 to 50 and m is an integer from 2 to 15.

* * * * *